(12) United States Patent
Yost

(10) Patent No.: US 10,528,992 B2
(45) Date of Patent: Jan. 7, 2020

(54) SYSTEM AND METHOD FOR AUTOMATED EXECUTION OF DEVICE-RELATED SERVICES

(71) Applicant: Visa International Service Association, San Francisco, CA (US)

(72) Inventor: Robert Yost, San Francisco, CA (US)

(73) Assignee: Visa International Service Association, Foster City, CA (US)

(*) Notice: Subject to any disclaimer, the term of this patent is extended or adjusted under 35 U.S.C. 154(b) by 0 days.

(21) Appl. No.: 16/013,721

(22) Filed: Jun. 20, 2018

(65) Prior Publication Data

US 2018/0300776 A1    Oct. 18, 2018

Related U.S. Application Data

(63) Continuation-in-part of application No. 15/900,159, filed on Feb. 20, 2018, and a continuation of application No. 15/483,562, filed on Apr. 10, 2017, now Pat. No. 9,972,035, which is a continuation of application No. 15/043,222, filed on Feb. 12, 2016, now Pat. No. 9,672,543.

(51) Int. Cl.
*H04B 17/00* (2015.01)
*G06Q 30/02* (2012.01)

(52) U.S. Cl.
CPC .................. *G06Q 30/0283* (2013.01)

(58) Field of Classification Search
CPC ........ H04L 1/20; H04L 1/24; G06W 30/0267; G06W 30/0261; G06W 30/0214; G08B 29/14; G08B 21/20

USPC ................. 375/224; 705/14.16, 44
See application file for complete search history.

(56) References Cited

U.S. PATENT DOCUMENTS

| 6,098,051 A | 8/2000 | Lupien et al. |
| 6,754,470 B2 | 6/2004 | Hendrickson et al. |
| 7,493,234 B2 | 2/2009 | Greco et al. |

(Continued)

FOREIGN PATENT DOCUMENTS

| CN | 102132300 | 7/2011 |
| CN | 102812500 | 12/2012 |

(Continued)

OTHER PUBLICATIONS

EP16890112.2, "Extended European Search Report", dated Nov. 16, 2018, 8 pages.

(Continued)

*Primary Examiner* — Khai Tran
(74) *Attorney, Agent, or Firm* — Kilpatrick Townsend & Stockton LLP

(57) ABSTRACT

Described herein is a platform and method for enabling electronic devices to initiate device-related services automatically (e.g., without user interaction), which may be services related to a primary function of the electronic device. In some embodiments, this may involve receiving a number of details from the electronic device (which may include performance metrics), identifying one or more third-party entities capable of providing a service, identifying a format or structure (e.g., a template) associated with the one or more third-party entities, populating the identified format with the details from the electronic device, and obtaining the service from one of the third-party entities.

19 Claims, 16 Drawing Sheets

(56) References Cited

U.S. PATENT DOCUMENTS

| | | | |
|---|---|---|---|
| 7,664,617 | B2 | 2/2010 | Greco et al. |
| 9,672,543 | B1 | 6/2017 | Yost et al. |
| 9,972,035 | B2 | 5/2018 | Yost et al. |
| 2003/0061117 | A1 | 3/2003 | Onodera |
| 2008/0041147 | A1 | 2/2008 | David |
| 2010/0156653 | A1 | 6/2010 | Chaudhari et al. |
| 2010/0169231 | A1 | 7/2010 | Bowles et al. |
| 2012/0072462 | A1 | 3/2012 | Gu et al. |
| 2012/0198279 | A1 | 8/2012 | Schroeder |
| 2012/0215336 | A1 | 8/2012 | Yucel et al. |
| 2013/0346236 | A1* | 12/2013 | Fung ............... G06Q 20/29 705/26.8 |
| 2014/0012709 | A1 | 1/2014 | Bishop et al. |
| 2014/0046796 | A1* | 2/2014 | Rogel ............ G06Q 30/0613 705/26.41 |
| 2014/0310078 | A1* | 10/2014 | Andriyanenko ....... G06Q 30/00 705/14.14 |
| 2015/0066586 | A1 | 3/2015 | Teraoka et al. |
| 2015/0356637 | A1 | 12/2015 | Graffia, II et al. |
| 2016/0171260 | A1* | 6/2016 | Tanabe ............ G06K 7/10297 340/10.51 |
| 2016/0203542 | A1 | 7/2016 | Pomerant et al. |
| 2016/0335725 | A1* | 11/2016 | Philbrick ............ G06Q 40/08 |
| 2017/0236172 | A1 | 8/2017 | Yost et al. |
| 2018/0174208 | A1 | 6/2018 | Yost et al. |
| 2018/0247315 | A1* | 8/2018 | Stuart ............... G06Q 30/0601 |

FOREIGN PATENT DOCUMENTS

| | | |
|---|---|---|
| JP | 2005242801 | 9/2005 |
| JP | 2009076095 | 4/2009 |
| JP | 2014229128 | 12/2014 |
| KR | 20110061890 | 6/2011 |
| KR | 1020110061890 | 6/2011 |
| KR | 20140007178 | 1/2014 |
| RU | 2161819 | 1/2010 |
| WO | 2007109297 | 9/2007 |
| WO | 2009016728 | 2/2009 |

OTHER PUBLICATIONS

U.S. Appl. No. 15/900,159, "Non-Final Office Action", dated Oct. 29, 2018, 9 pages.

KR10-2018-7026180, "Office Action", dated Jan. 14, 2019, 21 pages.

U.S. Appl. No. 15/043,222, "Non-Final Office Action", dated Sep. 28, 2016, 9 pages.

U.S. Appl. No. 15/043,222, "Notice of Allowance", dated Jan. 20, 2017, 8 pages.

U.S. Appl. No. 15/043,222, "Supplemental Notice of Allowability", dated May 10, 2017, 2 pages.

U.S. Appl. No. 15/483,562, "Non-Final Office Action", dated Aug. 2, 2017, 14 pages.

U.S. Appl. No. 15/483,562, "Notice of Allowance", dated Jan. 10, 2018, 8 pages.

PCT/US2016/066724, "International Search Report and Written Opinion", dated Apr. 5, 2017, 13 pages.

"Art That Sells Itself", NY Times Magazine Article, May 7, 2010, 3 pages.

AU2016392586, "First Examination Report", dated Jul. 25, 2018, 3 pages.

AU2016392586, "Second Examination Report", dated Jan. 24, 2019, 4 pages.

AU2016392586, "Response to Second Examination Report", dated Mar. 27, 2019, 3 pages.

RU2018132268, "Office Action", dated Mar. 1, 2019, 12 pages.

KR10-2018-7026180, "Office Action", dated May 28, 2019, 9 pages.

CN201680081542.3, "Office Action", dated Apr. 11, 2019, 11 pages.

RU2018132268, "Decision to Grant", dated Jun. 27, 2019, 16 pages.

AU2016392586, "Third Examination Report", dated Apr. 26, 2019, 5 pages.

CN201680081542.3, "Office Action", dated Sep. 20, 2019, 19 pages.

\* cited by examiner

SYSTEM AND METHOD FOR AUTOMATED EXECUTION OF DEVICE-RELATED SERVICES

CROSS-REFERENCE TO RELATED APPLICATIONS

This application is a continuation-in-part application of U.S. patent application Ser. No. 15/900,159, filed Feb. 20, 2018 entitled SYSTEM AND METHOD FOR DEVICE VALUATION, which is a continuation application of U.S. patent application Ser. No. 15/483,562, filed Apr. 10, 2017, entitled SYSTEM AND METHOD FOR DEVICE VALUATION, now U.S. Pat. No. 9,972,035 issued on May 15, 2018, which is a continuation of U.S. patent application Ser. No. 15/043,222, filed Feb. 12, 2016 entitled SYSTEM AND METHOD FOR DEVICE VALUATION, now U.S. Pat. No. 9,672,543, issued on Jun. 6, 2017.

BACKGROUND

Consumers purchase and use numerous electronic devices and appliances. With the evolution of the "Internet of Things," these devices are becoming increasingly self-aware and capable of communication using commonly understood networking protocols. However, they are also often "sunk cost" depreciating assets in a typical consumer's home or business, offering little to no value, short of an active effort to manually attempt to sell or otherwise monetize these electronic devices. Even then, in a manual sale offer, the condition of these devices is often difficult to ascertain or verify visually by a prospective buyer. This is the case even when the technical specifications of the device are known, as there is still no way to guarantee that the device is functioning to manufacturing specifications. This functionality (or a lack thereof) would presumably impact the device's resale value.

Additionally, it may be difficult for a user to ascertain the appropriate time to discard or replace an electronic device. For example, the functionality of a particular electronic device may decrease even as newer versions of the device become faster, more resilient, and/or more efficient. It may be difficult to determine whether the cost of replacement for the electronic device is offset by the increased functionality of a new device.

Once a user has determined that an electronic device should be replaced or discarded, the user must often then undertake a process to sell the electronic device. This might involve creating a product offer listing on one or more electronic retailer websites. This can be a time-consuming process if the user wishes to use more than one electronic retailer to sell the electronic device. Furthermore, the user might then need to monitor each of the electronic retailers to determine when the device has been sold. Failing to do this might lead to the user accidentally selling the device two or more times to different purchasers, which can ultimately cause a bad review to be left by at least some of those purchasers.

Embodiments of the invention address these and other problems, individually and collectively.

BRIEF SUMMARY

Embodiments of the invention are directed to a platform for generating a device valuation for an electronic device based at least in part on a functionality assessment of the electronic device. In this disclosure, a resident software module may be executed from an execution environment of an electronic device in order to assess the electronic device's performance. A base value may be calculated for the electronic device based on model information. The electronic device's performance is compared to the electronic device's technical specifications and expected performance to calculate an appropriate value from the base value.

One embodiment of the invention is directed to a method comprising receiving a request for a device valuation associated with an electronic device. The method also includes obtaining a model information for the electronic device; and identifying a base value for the electronic device based at least in part on the model information. Then, in response to causing execution of a device-specific performance evaluation upon a hardware component contained within the electronic device, the method includes generating a set of parameter values based upon the execution of said device-specific performance evaluation. Thereafter, an assessment of the electronic device may be generated based at least in part on the generated set of parameter values and the base value.

Another embodiment of the invention is directed to a server computer comprising a processor and computer-readable medium coupled to the processor, where the computer-readable medium comprises code, executable by the processor, for performing a method. The method comprises determining a base value associated with the electronic device and obtaining specification values associated with the electronic device. The method further comprises executing a performance evaluation to obtain one or more parameter values and determining, by comparing the one or more parameter values to the specification values, a value adjustment. The method may comprise generating a device valuation for the electronic device based at least in part on the base value and the value adjustment.

Another embodiment of the invention is directed to a method comprising receiving a request to provide a device valuation and obtaining a model information associated with the electronic device. The method further comprises sending an instruction to the electronic device to initiate a performance evaluation, and in response, receiving a set of parameter values associated with a functionality of the electronic device. The method may then comprise determining, based on the model information, a base value associated with the electronic device and subsequently determining, based at least in part on the received set of parameter values and the base value, the device valuation.

Another embodiment of the invention is directed to a method of obtaining a device-related service comprising receiving a request to obtain the device-related service for a device, receiving, from the device, information related to the device, identifying a number of third-party computers capable of providing the device-related service, providing requests for the device-related service to the number of third-party computers, each of the requests including the information related to the device, receiving a number of responses from the number of third-party computers, selecting, from the number of responses, a most-favorable response, and initiating a process to obtain the device-related service from a third-party computer associated with the most-favorable response.

Another embodiment of the invention is directed to a service computer comprising: a processor; and a memory including instructions that, when executed with the processor, cause the service computer to, at least: receive a request to obtain the device-related service for a device, receive, from the device, information related to the device, identify a number of third-party computers capable of providing the device-related service, provide requests for the device-related service to the number of third-party computers, each of the requests including the information related to the device, receive a number of responses from the number of third-party computers, select, from the number of responses, a most-favorable response, and initiate a process to obtain the device-related service from a third-party computer associated with the most-favorable response.

Another embodiment of the invention is directed to a method of changing ownership of a device comprising: receiving, at the device, a request to sell the device; estimating, by the device, an appropriate value of the device, advertising the device to a number of proximate devices at the estimated appropriate value, receiving, by the device from a proximate device of the number of proximate devices, a request to conduct a transaction, the request including information to be used in conducting the transaction, conducting the transaction using the received information, and updating an ownership status of the device based on the conducted transaction.

In some embodiments, a valuation may be provided with respect to a difference between the parameter values and expected values for the same or a different electronic device. The valuation may represent a value of upgrading to a newer version of the electronic device or replacing the electronic device. In some embodiments, the valuation may be compared to a valuation generated for the electronic device to determine that the electronic device should be upgraded or replaced.

These and other embodiments of the invention are described in further detail below.

DETAILED DESCRIPTION

Figure 1:
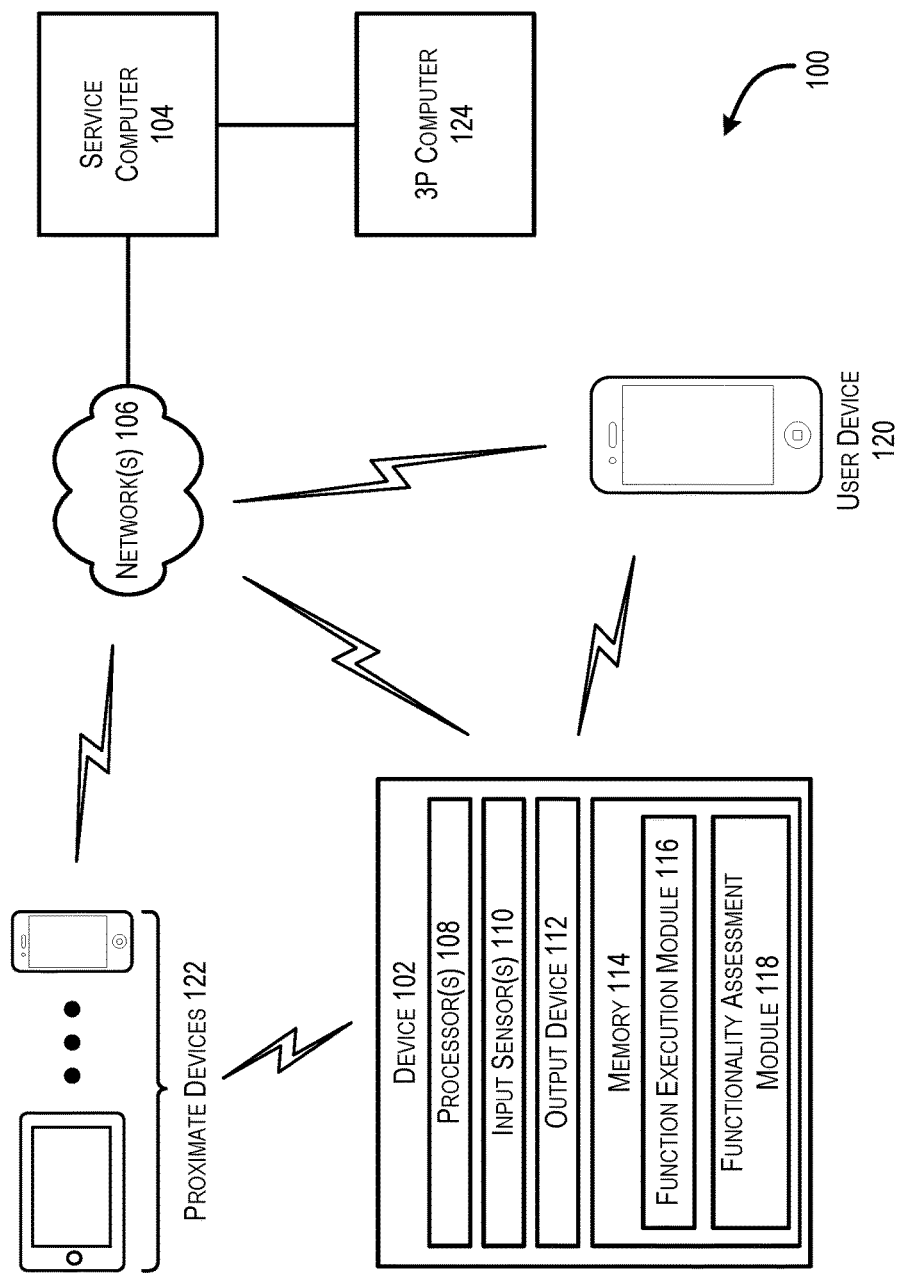
FIG. 1 depicts an illustrative example of a system or architecture in which techniques for implementing a device valuation functionality on an electronic device may be implemented.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present invention are directed to systems, methods, apparatuses, and computer readable media for providing a system and method for analyzing the hardware components and the respective performance capabilities of an electronic device, and then attributing a valuation to that electronic device based upon that analysis. This valuation can then be used to monetize that underlying device through transactions like sale or asset secured lending with little to no user intervention. In some embodiments, a resident software module may be executed from a device to execute a performance evaluation on the electronic device and to analyze the electronic device's performance. In some embodiments, model information may be obtained to understand the device's technical specifications and expected performance. The model information may be obtained by a service computer or by the device. In some embodiments, the model information may be used to determine a base value for the electronic device. Upon completion of the performance evaluation, a valuation may be generated for the electronic device based on the base value and the electronic device's performance with respect to its expected performance.

Embodiments of the present invention are also directed to techniques for automatically obtaining device-related services for a particular device. In some embodiments, a device-related service may be a service to sell the device. For example, techniques described herein enable a device to offer itself for sale. In some cases, this may involve posting offers for sale on a number of electronic retail websites. In some cases, this may involve advertising the device's availability to a number of proximate devices. In some embodiments, a device-related service may be obtaining insurance coverage for the device. For example, techniques described herein enable a device to obtain insurance coverage for itself. This may involve generating a number of requests and providing those requests to third-party computers (e.g., insurance providers).

Prior to discussing embodiments of the invention, description of some terms may be helpful in understanding embodiments of the invention.

A "base value" may be a generalized estimation of a value of something. In some embodiments, a base value may include a generalized estimation of the value of an electronic device at a particular point in time. For example, a base value may be an average value associated with a particular model of the electronic device. In another example, the base value may be a maximum value of an electronic device if it is in perfect condition. In this latter example, the base value of an electronic device may be the manufacturer's suggested retail price (MSRP) of an electronic device during its first year being sold. In some embodiments, a base value may be calculated using one or more formulae associated with the electronic device.

A "device identifier" may include any suitable indicia to identify a device. For example, a device identifier may include any series of characters, numbers, graphics, symbols, or other information that may be associated with an electronic device. Typically, a device identifier is utilized to uniquely identify the electronic device in order to initiate one or more functions remotely. For example, a network address may be an example of a device identifier that may be used to initiate one or more operations to be performed by the electronic device. In this example, an instruction to initiate the operation may be transmitted to the network address.

A "device layer" may include functional software that operates at a device level. In some embodiments, a device layer may be any execution environment of an electronic device configured to communicate with a service computer of a service computer and to execute programmatic instructions stored on the electronic device. In some embodiments, software in the device layer may be present in a secure execution environment such as a secure memory (e.g., smartcard-based technology available in low-power devices). In some embodiments, the device layer may be present in a secure storage (e.g., secure key storage). In some environments, a device layer may be an execution environment remote from the electronic device. For example, the electronic device may be a thin-client device configured to execute instructions provided as a result of processing performed at a remote server. In some embodiments, the device layer may be a virtual instance or virtual environment in a cloud-based system. For example, a performance evaluation executed from a virtual instance on a remote server may provide instructions to one or more components of the electronic device. In this example, the remote server may also be configured to receive data directly from one or more input sensors of the electronic device.

A "device valuation" may be an estimation of the value of a specific instance of an electronic device. For example, a device valuation may comprise an estimation of an amount of currency for which the electronic device would sell in an open market. In another example, a device valuation may comprise an estimate of a benefit that the electronic device may provide over its life. In some embodiments, the device valuation may be provided in order to estimate a fair purchase price of the electronic device. In some embodiments, a device valuation may provide an estimation of a recovery amount for an electronic device used as collateral to secure a credit extension. In some embodiments, the device valuation may include an upgrade value, or a difference in value between the current device and another version of the device. In some embodiments, the device valuation may be measured in units other than currency. In some embodiments, a device valuation may comprise an estimation of value with respect to another good or service (e.g., another electronic device). For example, one particular electronic device may be worth two of a different electronic device.

An "electronic marketplace" may be any virtual environment from which one or more products (goods and/or services) may be obtained. An electronic marketplace may comprise a website or other online presence maintained by a marketplace operator. In some embodiments, products that may be obtained from the electronic marketplace may be listed, or otherwise made available, via the electronic marketplace by one or more third party entities (entities unaffiliated with the marketplace operator). In some embodiments, an electronic marketplace may include a searchable database (or catalog) of product listings.

A "functionality assessment module" may be any set of instructions configured to, when executed by a processor, cause a performance evaluation for an electronic device to be initiated. For example, the functionality assessment module may be a software module stored on, and executed from, an execution environment of the electronic device. In this example, the functionality assessment module may cause one or more functions of the electronic device to be executed. Before, after, and/or during the execution of the one or more functions of the electronic device, the functionality assessment module may also cause one or more input sensors to collect data regarding the execution of the one or more functions of the electronic device. The functionality assessment module may be configured to analyze or otherwise process the collected data. In some embodiments, the functionality assessment module may comprise instructions implemented on an integrated circuit such as an application-specific integrated circuit (ASIC) chip or a field-programmable gate array (FPGA). In some embodiments, the functionality assessment module may comprise instructions implemented on a microcontroller or system on chip (SoC).

An "electronic device" may be any type of device operates using electricity. In some embodiments, the electronic device may have a primary function, or a function that most closely aligns with the electronic device's purpose. In some embodiments, the electronic device may have one or more secondary functions (functions other than the device's primary function). The electronic device may operate using instructions executed from a device layer.

"Model information" may include any information related to the particular instance of the electronic device. For example, the model information may include a model number or identifier, a year produced, a version, a base value of the electronic device, an original price (e.g., a retail price) of the electronic device, or any other suitable information that may be used to identify a specific type of the electronic device. In some embodiments, the model information may also include an age of the electronic device. In some embodiments, the model information may include an indication of any upgrades or other modifications made to the electronic device.

A "parameter value" may be any suitable value associated with a parameter of the execution of a performance evaluation on an electronic device. For example, upon the electronic device's execution of a performance evaluation, input sensors on the electronic device may collect input related to one or more executed functions. A parameter value may then be determined from the collected input by measuring a response of the electronic device during the execution of the function. In some embodiments, the parameter value may represent a level or intensity of an input detected over a period of time. In some embodiments, the parameter value may comprise a time for the electronic device to complete a particular function or task. By way of illustration, if a performance evaluation is being conducted on a water heater, a thermometer may be used to collect temperature information on water being heated by the water heater. In this example, a parameter value may represent the amount of time that the water heater takes to heat a full tank of water to a particular temperature. Another parameter value may represent the amount of energy expended by the water heater over a specified period of time to maintain a particular temperature. By way of a second illustration, if a performance evaluation is being conducted on an audio speaker, a microphone (input sensor) may be used collect information on sound output by the audio speaker. In this example, the parameter value may represent the collected audio information. In some embodiments, collected parameter values may be compared to expected values to determine a delta (e.g., an amount of variance). Further to this example, if a note at 8 decibels was expected from the audio speaker and a note at 6 decibels was detected, then the service computer may identify a delta of −2. In some embodiments, a parameter value may be an array, or series, of values.

A "performance evaluation" may be any operation that may assess the capabilities of an electronic device. For example, a performance evaluation may comprise the execution of one or more functions of an electronic device while collecting input related to the execution of that function. For example, the electronic device may execute a function while timing the execution of the function. In another example, the performance evaluation may comprise an execution of a function while collecting information on the amount of a resource consumed during the execution of the function. By way of non-limiting illustrative example, a performance evaluation may include determining a speed of a central processing unit (CPU) by performing operations to benchmark the CPU's performance against known and expected speeds; playing a sound through the electronic device's speaker system and using the electronic device's microphone to detect the sound in order to gauge its volume and clarity (to determine if the speakers of the electronic device are functioning or are "blown out"); testing an electronic device's ability to vibrate (in the example of a phone) by measuring the vibrations via an internal accelerometer; measuring the internal temperature of said device against the "set" temperature to ensure that the device is properly cooling or measuring the time it takes for the electronic device to reach the set temperature; and performing an on-board diagnostic system (OBD-II) diagnostic query on an accessible/addressable vehicle component. The performance evaluation itself may be device-specific, in that the parameters measured depend upon the type of electronic device being evaluated and its features/capabilities.

A "product listing" may be any listing of goods and/or services. In some cases, the goods and/or services may be available from a marketplace. The marketplace may comprise an electronic marketplace or a physical retail store. For example a product listing may comprise a catalog of goods currently being offered for sale on a retail website. A product listing may include various pieces of information related to a product to which the product listing is associated. For example, the product listing may include a picture of the product (or a stock image of the product), a description of the product, various specifications related to the product, a price at which the product is being offered, or any other suitable product-related information. In some embodiments, a product listing may comprise a network document (e.g., a website) that includes information related to a particular product. Such a network document may be stored in a directory maintained by a marketplace operator.

A "service layer" may be any suitable software module that operates at a service level. It may be present in an execution environment of a service computer configured to communicate with a device layer of an electronic device and can provide programmatic instructions to the electronic device. The service layer may be configured to receive a set of parameter values from the electronic device in response to initiating a performance evaluation. The service layer may be configured to generate a valuation in some embodiments of the invention.

A "service computer" or "service computer" may include any system associated with an entity that provides a resource or service. In some embodiments, the service computer may handle functionality of a computer application associated with the entity that provides the resource or service. The service computer may provide any suitable service. For example, the service computer may be a merchant, a utility company, a payment processing network, a wallet provider, a merchant, a website operator, or a bank.

A "third-party (3P) device" or "third party computer" may be any electronic device operated on behalf of an entity unaffiliated with the system described herein capable of being communicated with via the system described herein. In some embodiments, third-party devices may include mobile devices operated by others users. In some embodiments, third-party devices may include computers operated by third-party entities. For example, a third-party device may comprise a computing device operated by an insurance agency. In this example, a device of the system described herein may provide an estimated value to the third-party computing device in order to obtain a device-related service (e.g., insurance coverage) for the device of the system.

FIG. 1 depicts an illustrative example of a system or architecture 100 in which techniques for implementing a device valuation functionality on an electronic device may be implemented. In architecture 100, an electronic device may include a device 102 configured to execute one or more functions of the electronic device. The depicted system may also include a service computer 104 in communication with the device 102 via one or more networks 106.

In some embodiments, the device 102 may be a machine that has included within it, the components 108, 110, 112, and 114 (which are described in detail below). For example, the device 102 may be a smart refrigerator that has included within its housing, processors 108, input sensors 110, output devices 112, and memories 114. In other embodiments, the components 108, 110, 112, 114 may reside outside of a housing of a particular machine such as an ordinary refrigerator that does not have smart functions or a processor. In such embodiments, the ordinary refrigerator and the processor 108, input sensors 110, output device 112, and memories 114 may still be considered a single device, even if the components of the device do not reside within a single housing.

The device 102 may include one or more processors 108 capable of processing user input. The device 102 may also include one or more input sensors 110 for receiving user input. As is known in the art, there are a variety of input sensors 110 capable of detecting user input, such as keyboards, mice, accelerometers, cameras, microphones, etc. The user input obtained by the input sensors may be from a variety of data input types, including, but not limited to, audio data, visual data, or biometric data. The device 102 may include an output device 112 configured to convey information to one or more users of the electronic device. An output device may comprise a speaker, a display device, or any other suitable means of communicating data to a user. Embodiments of the application on the device 102 may be stored and executed from its memory 114.

Turning to the contents of the memory 114 in more detail, the memory 114 may include a function execution module 116 configured to execute the electronic device's primary function. The memory 114 may also include a functionality assessment module 118 that is capable (in conjunction with the processor 108) of determining one or more parameter values to be associated with the electronic device. Although sample architecture 100 depicts a functionality assessment module 118 as being included in the contents of the memory 114 of the device 102, some embodiments may not include a functionality assessment module 118 in memory 114 of the device 102. In those embodiments in which the functionality assessment module 118 is not included in memory 114, the device 102 may be in communication with a functionality assessment module 118 executed from the service computer 104. For example, the device 102 may be in communication with the service computer 104, and may provide feedback to the service computer operating the service computer 104 in response to receiving instructions. In this example, the service computer 104 may communicate with the device 102 to execute the functionality assessment module 118 remotely.

In some embodiments, the function execution module 116 may be configured to initiate and/or execute a function of an electronic device. For example, the function execution module 116 may be configured to receive input from a user via the input sensors 110 and initiate a function specified in the received input. In some embodiments, the electronic device may be configured to perform one or more functions automatically. In some cases, the electronic device may not include a function execution module 116. By way of illustrative example, a refrigerator (an electronic device) may be configured to maintain a temperature (the function of the electronic device) without the use of a software module. In this example, the refrigerator may not include a function execution module.

In some embodiments, the functionality assessment module 118 may be configured to collect one or more parameter values associated with a function of the electronic device. Upon receiving an activation signal, the functionality assessment module 118 may comprise code for collecting input information from one or more input sensors. The input information may include data related to one or more parameter values associated with a function of the electronic device. In some embodiments, parameter values may be compared to threshold parameter values to determine one or more offset values. In some embodiments, the functionality assessment module 118 may comprise code for receiving an activation signal from the service computer 104. In some embodiments, the functionality assessment module 118 may comprise code for receiving an activation signal from a user device 120. In some embodiments, the collected parameter values may be provided to the service computer 104 for processing.

In some examples, the network(s) 106 may include any one or a combination of many different types of networks, such as cable networks, the Internet, wireless networks, cellular networks, and other private and/or public networks. In addition, the networks 106 may comprise multiple different networks. For example, the device 102 may utilize a wireless local area network (WLAN) to communicate with a wireless router, which may then route the communication over a public network (e.g., the Internet) to the service computer 104.

In accordance with at least some embodiments, the device 102 and/or the service computer 104 may be in communication with a user device 120. The user device 120 may enable a user to interact with either a device layer associated with the device 102 or a service layer associated with the service computer 104. For example, the user device 120 may be utilized to initiate the function execution module 116 and/or the functionality assessment module 118. The user device 120 may be any type of computing device such as, but not limited to, a mobile phone, a smart phone, a personal digital assistant (PDA), a laptop computer, a desktop computer, a server computer, a thin-client device, a tablet PC, etc. Additionally, user device 120 may be any type of wearable technology device, such as a watch, earpiece, glasses, etc. The user device 120 may include one or more processors capable of processing user input. The user device 120 may also include one or more input sensors for receiving user input.

In some embodiments, the device 102 and service computer 104 may also be configured to communicate with one or more third-party devices. In some cases, the device 102 may establish a communication session with one or more proximate devices 122. For example, the device 102 may detect, via a wireless communication protocol, a number of devices within the vicinity of the device 102. In this example, the device 102 may determine that the proximate devices 122 are within some predetermined range (e.g., a vicinity) of the device 102 by virtue of being detected via a short range communication protocol (e.g., Bluetooth). In some embodiments, upon receiving a request to offer itself for sale, the device 102 may generate an offer to be provided to each proximate device 122 that establishes a communication channel with the device 102. In some embodiments, the offer may include a value of the device 102 estimated in accordance with at least some of the techniques described herein.

In some embodiments, the device 102, or the service computer 104 acting on behalf of the device 102, may communicate with a third-party computer to obtain one or more resources related to the device 102. For example, the service computer 104 may relay an estimated value of the device 102 to a computer operated on behalf of an insurance agency in order to obtain insurance coverage for the device 102. In this example, the service computer 104 may initiate a process to obtain insurance coverage in response to receiving a request or independent of any instructions to initiate such a process. In some embodiments, the system may communicate with multiple third-party devices to obtain various resources or estimates for obtaining resources. For example, the system may provide an estimated value of the device to computing devices operated by multiple insurance agencies in order to obtain a number of different estimates for insurance coverage.

For simplicity of illustration, a certain number of components are shown in FIG. 1. It is understood, however, that embodiments of the invention may include more than one of each component. In addition, some embodiments of the invention may include fewer than or greater than all of the components shown in FIG. 1. In addition, the components in FIG. 1 may communicate via any suitable communication medium (including the internet), using any suitable communications protocol.

Figure 2:
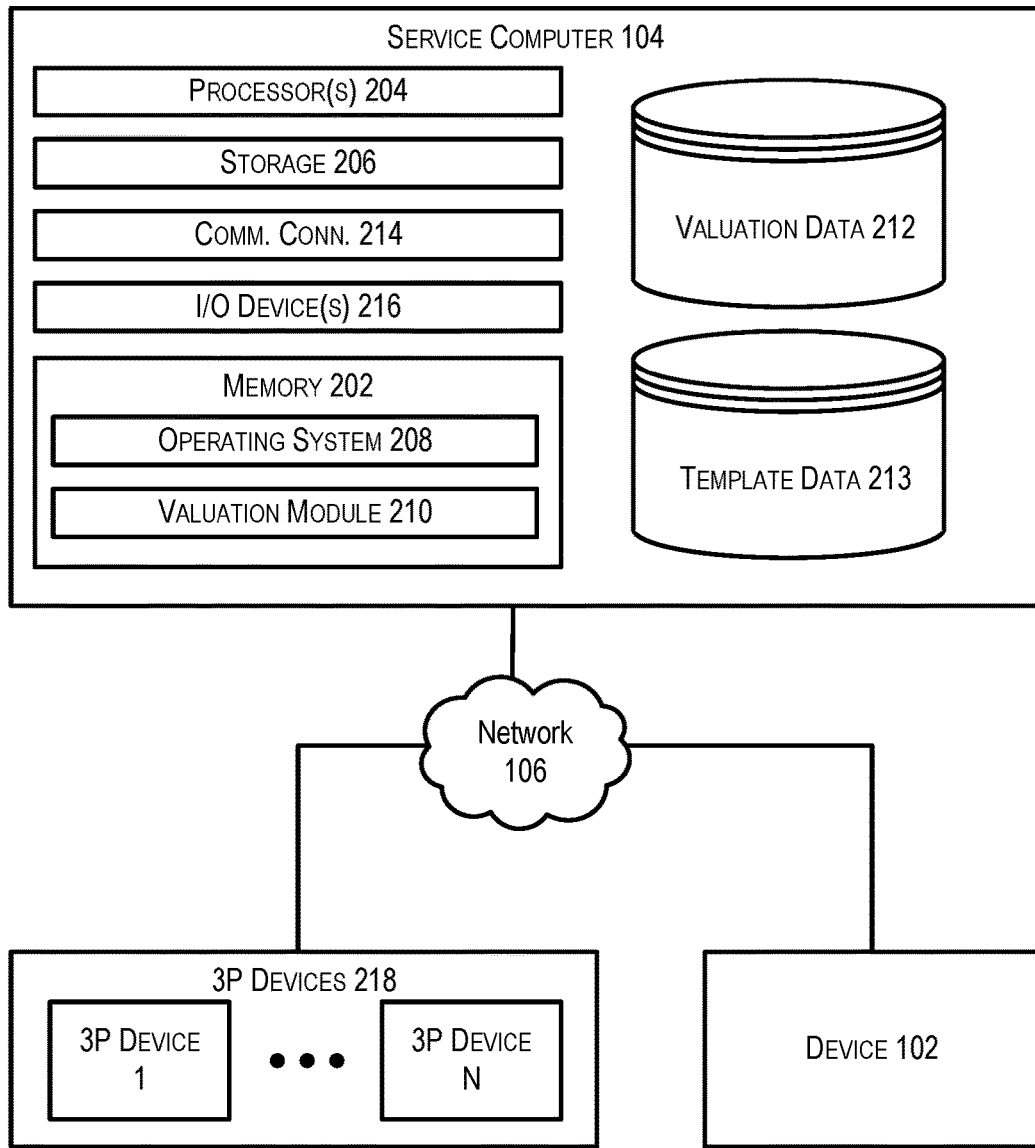
FIG. 2 depicts an illustrative example of a service computer capable of providing backend support for a device valuation platform in accordance with at least some embodiments.

FIG. 2 depicts an illustrative example of a service computer 104 capable of providing backend support for a device valuation platform in accordance with at least some embodiments.

The service computer may be any type of computing device including a remotely located server computer. Additionally, it should be noted that in some embodiments, the service computer 104 may be embodied by one more virtual machines implemented in a hosted computing environment. The hosted computing environment may include one or more rapidly provisioned and released computing resources, which computing resources may include computing, networking, and/or storage devices. A hosted computing environment may also be referred to as a cloud-computing environment.

In one illustrative configuration, the service computer 104 may include at least one memory 202 and one or more processing units (or processor(s)) 204. The processor(s) 204 may be implemented as appropriate in hardware, computer-executable instructions, firmware or combinations thereof. Computer-executable instruction or firmware embodiments of the processor(s) 204 may include computer-executable or machine executable instructions written in any suitable programming language to perform the various functions described.

The memory 202 may store program instructions that are loadable and executable on the processor(s) 204, as well as data generated during the execution of these programs. Depending on the configuration and type of service computer 104, the memory 202 may be volatile (such as random access memory (RAM)) and/or non-volatile (such as read-only memory (ROM), flash memory, etc.). The service computer 104 may also include additional storage 206, such as either removable storage or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some embodiments, the memory 202 may include multiple different types of memory, such as static random access memory (SRAM), dynamic random access memory (DRAM) or ROM. Turning to the contents of the memory 202 in more detail, the memory 202 may include an operating system 208 and one or more application programs or services for implementing the features disclosed herein including at least a module for determining a value associated with an electronic device (valuation module 210). The memory 202 may also include valuation data 212, which provides data associated with one or more valuation techniques, as well as template data 213, which stores and maintains a number of templates, each of which may be associated with an electronic retailer.

The memory 202 and the additional storage 206, both removable and non-removable, are examples of computer-readable storage media. For example, computer-readable storage media may include volatile or non-volatile, removable or non-removable media implemented in any method or technology for storage of information such as computer-readable instructions, data structures, program modules or other data. As used herein, modules may refer to programming modules executed by computing systems (e.g., processors) that are part of the user device 102 or the service computer 104. The service computer 104 may also contain communications connection(s) 214 that allow the service computer 104 to communicate with a stored database, another computing device or server, user terminals, and/or other devices on the network(s) 106. The service computer 104 may also include input/output (I/O) device(s) and/or ports 216, such as for enabling connection with a keyboard, a mouse, a pen, a voice input device, a touch input device, a display, speakers, a printer, etc.

Turning to the contents of the memory 202 in more detail, the memory 202 may include an operating system 208. A database containing valuation data 212 is shown and may also be incorporated into the memory 202 or a different memory. One or more application programs or services for implementing the features disclosed herein, including a valuation module 210, may also be stored in the memory 202. The valuation data 212 may comprise any suitable persistent data storage system. In some embodiments, the valuation data 212 may be stored in a database. Valuation information stored in the valuation database 212 may be accessed by the valuation module 210 via a database query or any other suitable data retrieval means.

In some embodiments, the valuation module 210 may, in conjunction with the processor 204, be configured to identify one or more valuation techniques associated with an electronic device 102 and provide a valuation for the electronic device 102. In some embodiments, the valuation techniques may be identified based at least in part on a type of electronic device 102 for which the valuation is being provided. In some embodiments, a valuation technique may be identified based on a third party entity (an entity unaffiliated with the electronic device 102 and the service computer) for which the valuation is being provided. For example, if the electronic device 102 will serve as collateral for a loan, then the valuation technique to be used may be identified by a loan officer. In another example, a third party entity may maintain a set of values for a device. For example, a third party entity may identify multiple values that may be associated with an electronic device 102 based on a condition of the electronic device 102.

Upon identifying a valuation technique to be used for the electronic device 102, the valuation module 210 may comprise code for receiving one or more parameter values provided by a functionality assessment module 118 executed on the electronic device 102. Upon receiving the one or more parameter values, the valuation module 210 may, in conjunction with the processor 204, determine a value for the electronic device 102 using the identified valuation technique, the received parameter values, and model information associated with the electronic device 102.

In some embodiments, a number of valuation techniques may be available to the valuation module 210. The valuation techniques available may include formulas, tables, references to electronic marketplaces, or any other suitable technique for assessing the value of a device. For example, the service computer 104 may maintain a formula to be used to value a particular electronic device 102. In some embodiments, each brand and/or model of the electronic device 102 may be valued according to a different formula. In this example, variables in the formula may be replaced by the received parameter values in order to calculate the value of the electronic device 102. In another example, the service computer may maintain a table of values, where a condition of the electronic device (estimated based on the received parameter values) is associated with a particular value. In yet another example, the service computer 104 may maintain a link to an electronic marketplace. In this example, the service computer may identify the last sale price of an electronic device 102 with similar parameter values as the value of the device.

In some embodiments, parameter values may be provided to the valuation module by the electronic device 102 to be evaluated. Parameter values may be collected using input sensors attached to the electronic device 102. The parameter values to be received may be defined in instructions included with the performance evaluation. For example, instructions for performing the performance evaluation may include an indication of functions to be executed as well as input sensors to be activated and values to be collected from those input sensors during execution of the functions. In this example, the parameter values may be associated with a performance of the electronic device 102.

In some embodiments, model information associated with the electronic device 102 may be stored at the service computer 104 (e.g., in valuation data 212). The model information may include a base value, instructions for the performance evaluation, and/or expected parameter values associated with the electronic device 102 to be valued. For example, each brand, model, and version of the electronic device 102 may have a separate base value, performance evaluation, and set of expected parameter values associated with it.

In some embodiments, the valuation data 212 may comprise valuation information to be associated with various electronic devices. In some embodiments, the valuation data may comprise one or more formulae to be associated with the electronic device 102. For example, the valuation data may include a formula that may be used to calculate a maximum value for a particular brand and model of an electronic device 102. The formula may take, as input, one or more variables representing an age of the electronic device 102, a condition of the electronic device 102, one or more parameter values for the electronic device 102, and/or any other suitable data.

In some embodiments, the service computer 104 may be configured to generate an offer for sale associated with the device 102 for which a value has been estimated. In some embodiments, this may involve identifying a number N of third-party devices 218 (e.g., resource providers) capable of presenting offers to potential consumers. For example, the third-party devices may comprise computers operated by electronic retailers that provide access to resources via a website. In this example, the service computer 104 may identify resource providers of the number of resource providers having websites upon which to present an offer for the device 102. The service computer 104 may then identify templates stored in the template data 213 associated with each of the identified resource providers. For example, the service computer may maintain a template for each resource provider. Upon determining that an offer should be generated for a particular resource provider, the service computer 104 may retrieve the template associated with that resource provider and populate that template with data associated with the device 102. The service computer 104 may populate the template with data specific to the device (e.g., an estimated value of the device 102) as well as information related to a category to which the device 102 belongs.

Figure 3:
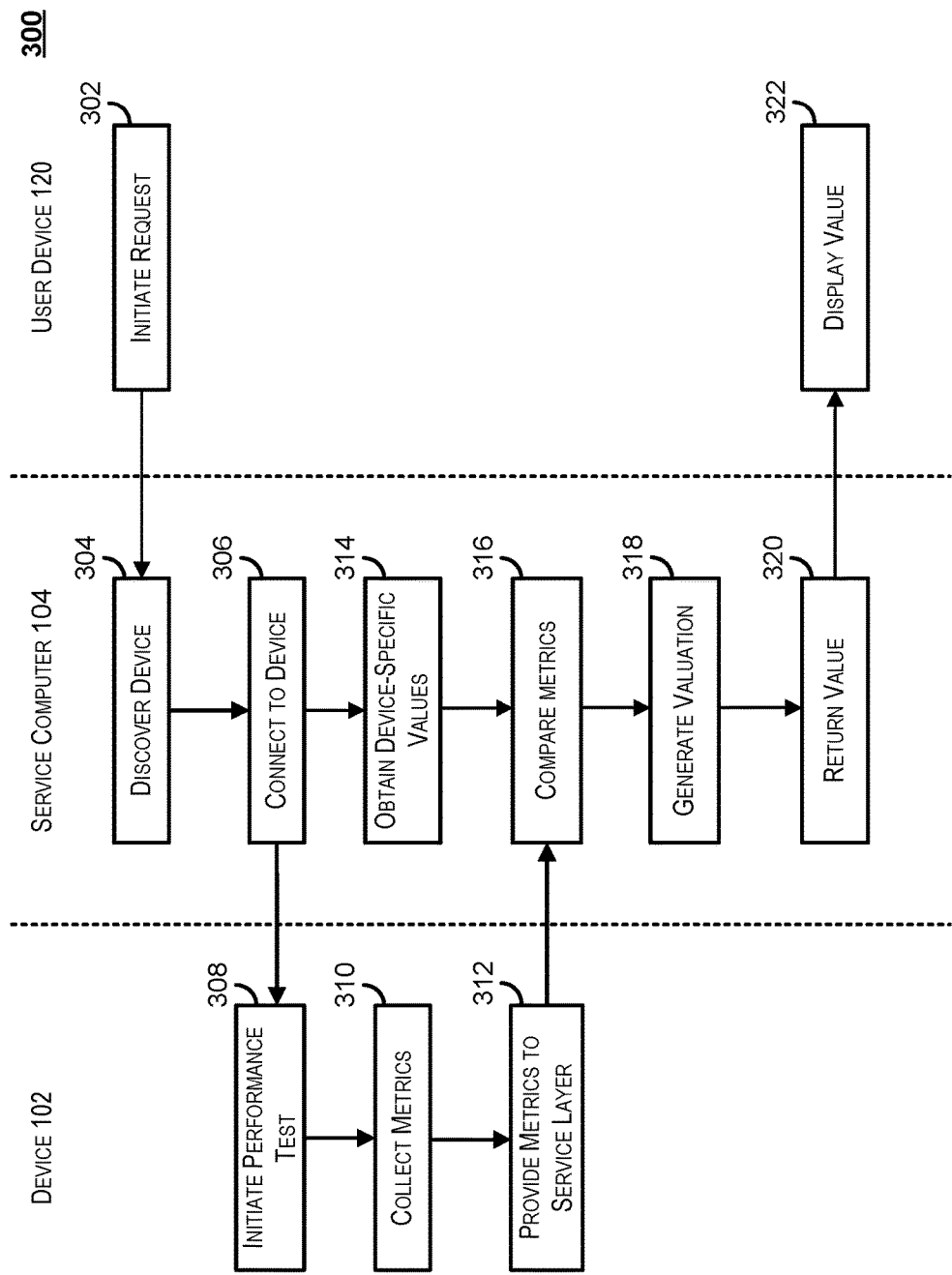
FIG. 3 depicts a process flow for collecting parameter values and generating a valuation for an electronic device in accordance with at least some embodiments.

FIG. 3 depicts a process flow for collecting parameter values and generating a valuation for an electronic device in accordance with at least some embodiments. FIG. 3 depicts interactions between a device 102, a service computer 104, and a user device 120. Each of the device 102, the service computer 104 and the user device 120 are described above in FIG. 1.

In FIG. 3, a request may be initiated at 302. In some embodiments, the request may be initiated by a user device 120. In some embodiments, the request may be initiated by the service computer 104. In some embodiments, the service computer 104 may receive an indication of the device for which a valuation is to be generated. At 304, the service computer 302 may perform a device discovery process to identify the indicated device. In some embodiments, the indicated device may be located at an internet protocol (IP) address. Once the device has been discovered, the service computer 104 may connect to the device at 306.

Once connected, the service computer 104 may cause the device 102 to initiate a performance evaluation of the device at 308. In some embodiments, the initiation of a performance evaluation may activate one or more input sensors capable of collecting data metrics from the device 102. The data metrics may be related to the functionality of the device 102. For example, the performance evaluation may collect information on how well the device 102 performs one or more functions. The device 102 may collect data metrics at 310. In some embodiments, the device 102 may provide the data metrics to the service computer 104 at 312 as a set of parameter values.

The service computer 104 may obtain device-specific values at 314. For example, the service computer 104 may query a valuation database to identify a set of expected values (e.g., values that would be expected from a fully functional version of the electronic device). In some embodiments, the service computer 104 may also obtain a valuation technique for the device. For example, the service computer may obtain a formula for assessing a base value for the device. In some embodiments, the service computer 104 may maintain a table of potential values, wherein entries within the table may be organized by condition, age, or any other suitable factor. In some embodiments, the base value may be a maximum value, an average value, or a minimum value for the device. In some embodiments, the service computer 104 may maintain a depreciation function and an expected useful life for the device that may be used to calculate a base value. For example, the device may be associated with a linear depreciation function with respect to time and may be given a specified useful life. In this example, a valuation for the device may be calculated as $$V_B = ([U-t]/U) * V_I$$

In this example, $V_B$ is the current base value of the device, $V_I$ is the initial value of the device (the value when new), U is the useful life of the device, and t is the age of the device. In some embodiments, the depreciation function may be tied to one or more accounting principles used to assess a value for the device. For example, the depreciation function may be determined based on an accounting principle maintained in a Statement of Financial Accounting Standards (SFAS) or an American Institute of Certified Public Accountants (AICPA) Statement of Position (SOP).

In some embodiments, the service computer 104 may maintain one or more valuation techniques determined using a machine learning algorithm, including algorithms that use workforce auditing (such as crowdsourcing platforms). In these embodiments, one or more machine learning and/or pattern recognition techniques may be used to identify a formula that is best able to predict a value of the device. For example, one or more machine learning algorithms may be trained on past valuation data for a device. In this example, if the device is sold, the actual sale price data for the device may be used to provide feedback for the machine learning algorithms.

In some embodiments, the service computer 104 may compare the set of parameter values provided by the device 102 to those of the obtained device-specific values at 316. In some embodiments, the service computer 104 may generate a valuation for the device at 318. For example, the service computer 104 may identify a base value for the device and adjust the value based on the difference between the set of parameter values and the device-specific values. The adjusted value may be returned to the user device at 320 and subsequently displayed by the user device 120 at 322.

Figure 4:
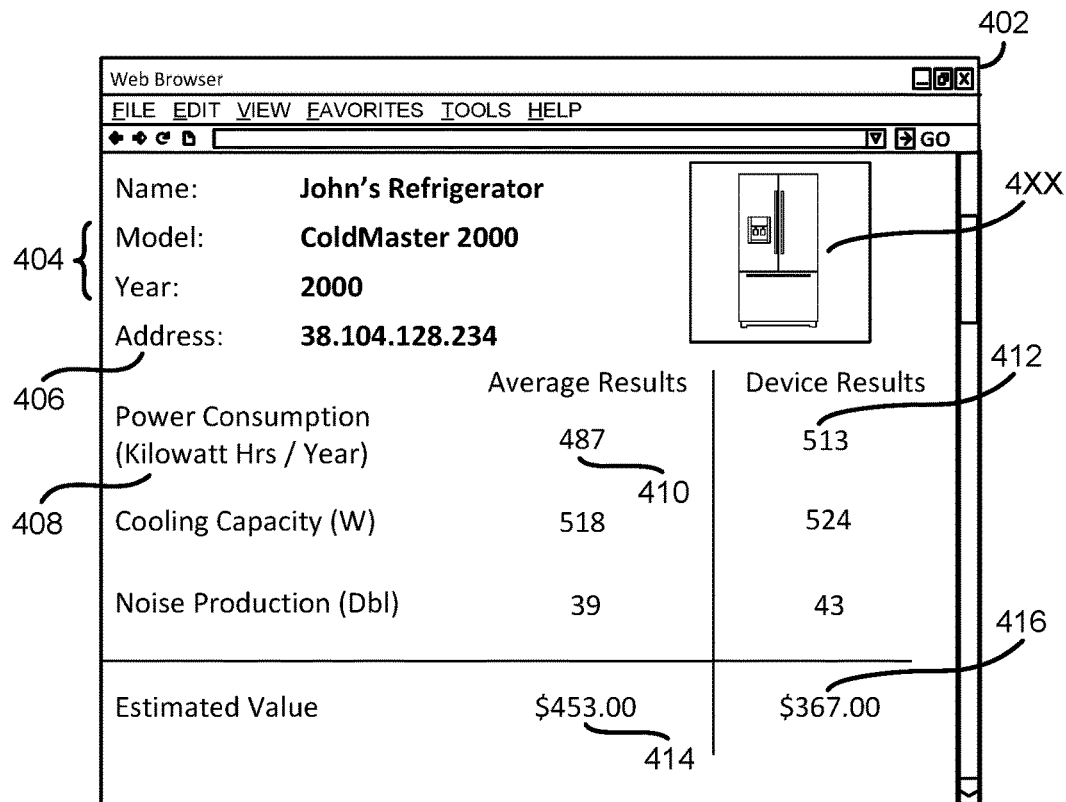
FIG. 4 depicts an illustrative example of a user interaction in accordance with at least some embodiments.

FIG. 4 depicts an illustrative example of a user interaction in accordance with at least some embodiments. FIG. 4 depicts an instance of a web browser 402 utilized to access a device valuation platform. In some embodiments, a user may access information provided by a service computer via the web browser 402. In some embodiments, the service computer may maintain a plurality of user accounts associated with a plurality of users. In some embodiments, a user account may be accessed using a username and/or password.

In some embodiments, a user account may be associated with one or more electronic devices. In some embodiments, the service computer may maintain one or more model information 404 associated with an electronic device. In some embodiments, the model information 404 may be provided by a user via the web browser 402. In some embodiments, the service computer may store a device identifier 406 in association with the electronic device. For example, a device identifier may be a network address, a phone number, a serial number, or any other suitable means of identifying/locating the electronic device. In some embodiments, the device identifier 406 may be provided by a user via the web browser 402. The service computer may initiate a performance evaluation of the electronic device using the device identifier 406. For example, the service computer may transmit an instruction to initiate a performance evaluation to a specified network address.

In some embodiments, the service computer may maintain a set of device-specific parameters 408. In some embodiments, the device-specific parameters may be stored with respect to a type of device. For example, each electronic device may be associated with a category of item, which may subsequently be associated with a set of device-specific parameters. In some embodiments, a device may belong to multiple categories. In some embodiments, a device may belong to a sub-category, which may be associated with additional device-specific parameters. A sub-category may inherit each of the device-specific parameters of its parent category as well as one or more additional parameters. For example, a particular model of laptop computer may belong to a "laptop" category, which may be a sub-category of a "computer" category. In the provided example, the laptop category may include each of the device-specific parameters included in the computer category as well as one or more parameters related to a screen display.

In some embodiments, the service computer may maintain one or more "expected" or average values 410 for each of the set of device-specific parameters with respect to a particular model of the electronic device. In addition, the service computer may receive a set of parameter values 412 from the electronic device itself. The set of parameter values 412 may be received from the electronic device in response to initiating a performance evaluation. In some embodiments, the average values 410 may be calculated from a number of parameter values received by the service computer over multiple tests. In some embodiments, the average values 410 may be provided by a third party entity (an entity unaffiliated with the service computer). For example, the average values may be provided by a manufacturer of the electronic device.

Upon receiving a set of parameter values from the electronic device, the service computer may identify a base value 414 for that model of the electronic device. The base value 414 may then be used to generate a valuation 416 of the electronic device by being adjusted to account for the differences in functionality exhibited during the performance evaluation. In some embodiments, the base value may be adjusted upwards or downwards based on the parameter values provided by the performance evaluation to generate a valuation. In some embodiments, the base value may act as a maximum value, such that it may only be adjusted downwards to generate a valuation of the device. The valuation 416 of the electronic device may be generated from the base value 414 using a number of techniques. The service computer may maintain a valuation formula to be used with respect to the particular model or category associated with the electronic device. In some embodiments, the service computer may assign various weights to each device-specific parameter in the set of device-specific parameters.

In some embodiments, the service computer may maintain a table of base values. For example, a table may comprise columns representing an age of the device and rows representing a condition of the device. The service computer may identify a condition of the electronic device from the provided parameter values and identify a base value based on the age of the electronic device. Although this specific illustration is described with respect to a table of base values, a table which includes other column and row values should be considered an equivalent. For example, a table may be maintained with estimated values for devices in "Excellent," "Very Good," "Good," "Fair" or "Poor" conditions. In this example, the service computer may determine which condition the electronic device is in based on the received parameter values and assign the corresponding value to the electronic device.

By way of illustrative example, consider the scenario in which the electronic device is a refrigerator. In this example, the service computer may maintain a set of device-specific parameters for the category "refrigerators." The service computer may also maintain a set of average values for the specific model of refrigerator in the scenario, wherein each of the average values corresponds to a device-specific parameter. In this illustrative example, the refrigerator for which the valuation is being provided may provide a set of parameter values that result from a performance evaluation run on the refrigerator. Each of the provided parameter values may also correspond to the device-specific parameters. The service computer may compare each of the parameter values to its corresponding average value to determine whether the refrigerator is functioning at a level above or below that of an average refrigerator of that same model. The service computer may then identify a base value for that model of the refrigerator (a value associated with an average refrigerator of that model). The service computer may subsequently adjust the base value to account for the differences in functionality exhibited during the performance evaluation. The adjusted base value may then be presented as a valuation for the particular refrigerator.

Figure 5:
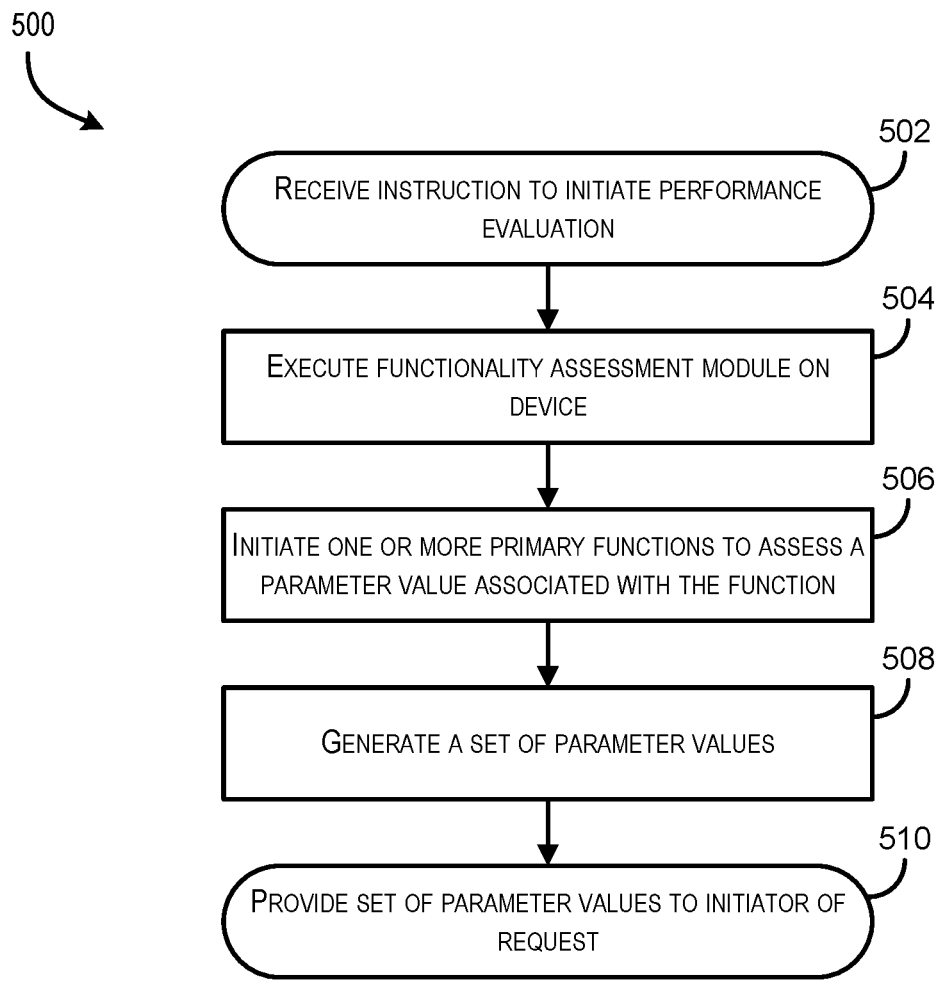
FIG. 5 depicts a process for executing a functionality assessment with respect to an electronic device in accordance with at least some embodiments.

FIG. 5 depicts a process for executing a functionality assessment with respect to an electronic device in accordance with at least some embodiments. The process 500 is illustrated as a logical flow diagram, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be omitted or combined in any order and/or in parallel to implement this process and any other processes described herein.

Some or all of the process 500 (or any other processes described herein, or variations and/or combinations thereof) may be performed under the control of one or more computer systems configured with executable instructions and may be implemented as code (e.g., executable instructions, one or more computer programs or one or more applications). In accordance with at least one embodiment, the process 500 of FIG. 5 may be performed by at least the device 102 depicted in FIG. 1. The code may be stored on a computer-readable storage medium, for example, in the form of a computer program including a plurality of instructions executable by one or more processors. The computer-readable storage medium may be non-transitory.

Process 500 may begin at 502, when an instruction is received by a device to initiate a performance evaluation. In some embodiments, instructions for executing the performance evaluation may be stored in a memory of the device. In some embodiments, the performance evaluation may be carried out by a functionality assessment module implemented on the electronic device, as described with respect to FIG. 1 above. The functionality assessment module on the device may be executed at 504.

In accordance with the performance evaluation, the functionality assessment module may initiate one or more primary functions to assess a parameter value associated with the function at 506. The performance evaluation may specify a number of actions to be performed. For example, the performance evaluation may specify an order in which particular functions should be tested, a time period over which a function is to be tested, an intensity or level of power at which to test a function, or any other suitable functionality testing criteria.

Upon executing the performance evaluation, one or more input sensors may be used to collect input from the electronic device. The input collected may be used to generate a set of parameter values at 508. The set of parameter values to be generated may be specified in instructions stored in the memory of the electronic device. For example, input may be collected by an input sensor. In this example, the input collected may be translated into a data value and stored as a parameter value. Once a set of parameter values has been generated, the set of parameter values may be provided to the initiator of the request at 510.

In some embodiments, the process 500 may be performed without human intervention. For example, the performance evaluation may not require that a user of the electronic device be present or take any action. In some embodiments, the performance evaluation may be initiated remotely by a service computer. In some embodiments, the performance evaluation may be initiated on a periodic basis. In some embodiments, the performance evaluation may be initiated on specified dates.

Figure 6:
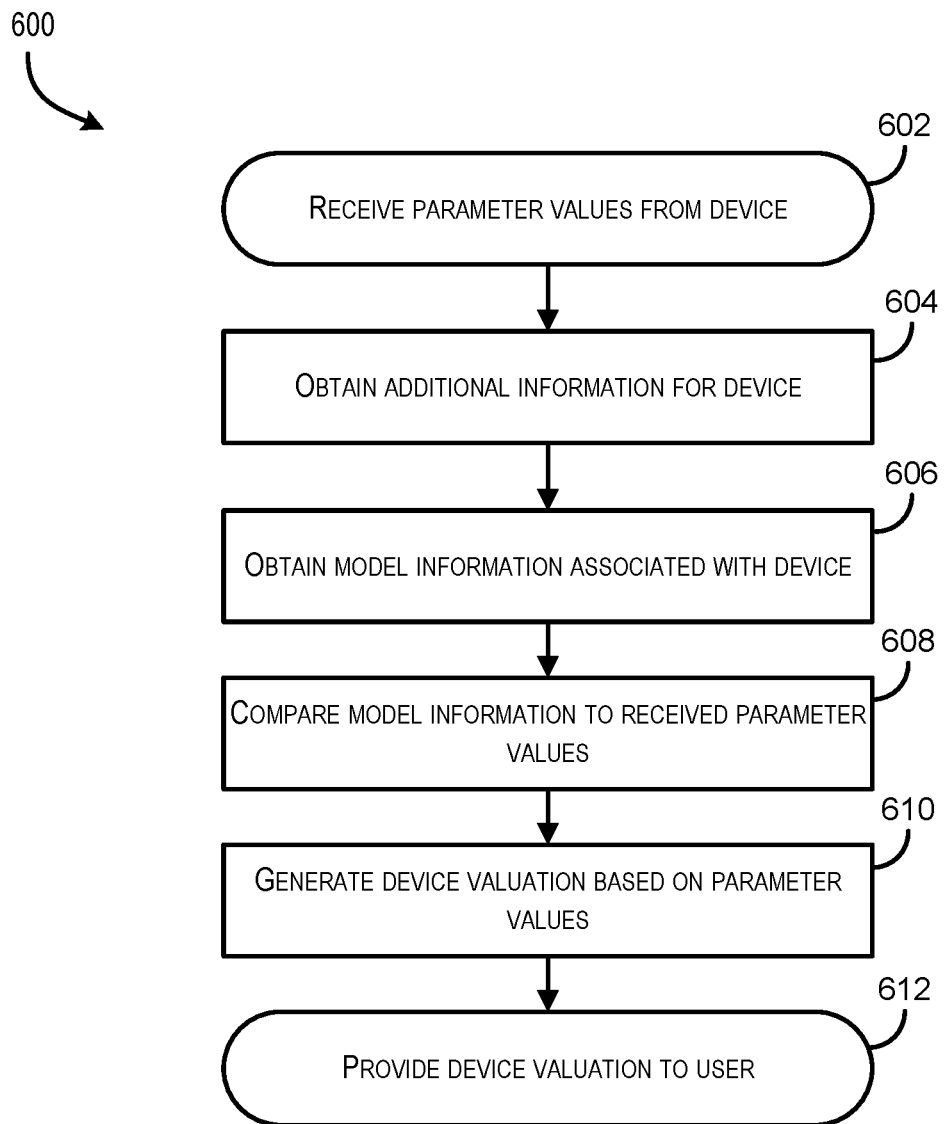
FIG. 6 depicts a process for applying one or more valuation techniques to a set of performance metrics in accordance with at least some embodiments.

FIG. 6 depicts a process for applying one or more valuation techniques to a set of performance metrics in accordance with at least some embodiments. Some or all of the process 600 (or any other processes described herein, or variations and/or combinations thereof) may be performed under the control of one or more computer systems configured with executable instructions and may be implemented as code (e.g., executable instructions, one or more computer programs or one or more applications). In accordance with at least one embodiment, the process 600 of FIG. 6 may be performed by at least the service computer 104 depicted in FIG. 1. The code may be stored on a computer-readable storage medium, for example, in the form of a computer program including a plurality of instructions executable by one or more processors. The computer-readable storage medium may be non-transitory.

Process 600 may begin at 602, when parameter values are received from an electronic device. In some embodiments, the service computer may obtain additional information related to the electronic device at 604. For example, the service computer may determine an age of the electronic device. In another example, the service computer may identify one or more upgrades, add-ons, or additional features. In some embodiments, the service computer may identify a value associated with each of the identified additional information.

In some embodiments, the service computer may obtain model information associated with the electronic device at 606. The model information may include an indication of a model number or identifier, a year produced, a version, or any other suitable information that may be used to identify a specific type of the electronic device. The model information may also include a method of generating a base value for the electronic device. For example, the model information may include a formula to be used in calculating a base value for the electronic device. The service computer may generate a base value for the electronic device based on the model information. The model information may also include model-specific specification values. For example, the model information may include a number of expected values associated with various functionalities of the electronic device.

At 608, the service computer may compare the specification values included in the model information to the received parameter values. The service computer may calculate a value adjustment based on a difference between the received parameter values and the identified specification values. The service computer may then generate a device valuation at 610. In some embodiments, the device valuation may be generated by adding the adjustment value to the determined base value. In some embodiments, the service computer may provide the device valuation to user at 612.

Figure 7:
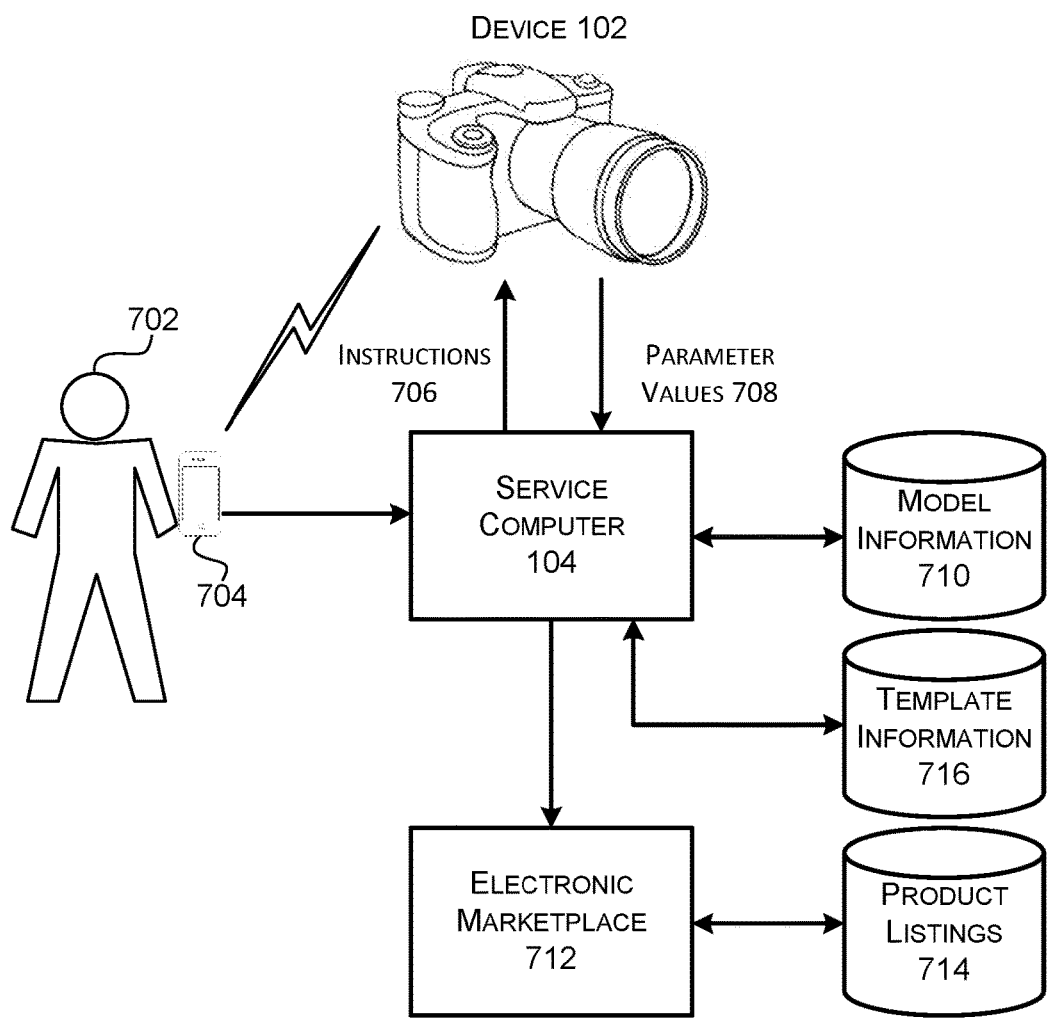
FIG. 7 depicts an illustrative example process in which a product listing is generated for a device in an electronic marketplace in accordance with at least some embodiments.

FIG. 7 depicts an illustrative example process in which a product listing is generated for a device 102 in an electronic marketplace in accordance with at least some embodiments. In some embodiments, the example process may be initiated by a user 702 via a mobile device 704. The mobile device 704 may be in communication with the device 102 and/or a service computer 104. The mobile device 704 may initiate the process via a web browser, mobile application, or any other suitable software module. In some embodiments, the example process may be initiated without the use of a mobile device. For example, the device 102 may have a button or other activation mechanism that, when activated, causes the device 102 to initiate the process described. In some embodiments, the process may result in the device 102 being offered for sale on one or more electronic marketplaces without further user intervention.

Upon receiving a request from the mobile device, the service computer 104 may cause an initiation of a performance evaluation of the device 102. The service computer 104 may send instructions 706 to the device 102 to initiate the performance evaluation. Upon execution of the performance evaluation as described above, the device 102 may collect a set of parameter values 708 which it may provide to the service computer 104. Upon receiving the set of parameter values 708, the service computer may query a database of model information 710 in order to identify device specifications (or expected parameter values) for the device 102. The service computer 104 may determine a valuation for the device 102 based on the identified specifications and the received set of parameter values 708. In some embodiments, the service computer 104 may query the model information 710 for an image of the device 102 (e.g., a stock photo).

The service computer 104 may be in communication with an electronic marketplace 712 or a marketplace operator operating an electronic marketplace 712. The electronic marketplace 712 may comprise a number of product listings 714, each associated with a different device. In some embodiments, the electronic marketplace 712 may be dedicated to a particular type of device. In some embodiments, the valuation generated by the service computer 104 may be generated based on similar devices listed in the set of product listings 714. In some embodiments, the service computer may be owned and/or operated by a marketplace operator.

The service computer 104 may generate a product listing formatted in accordance with the set of product listings 714 maintained by the electronic marketplace 712. In some embodiments, the service computer 104 may generate a product listing for the device by populating a template for the electronic marketplace with data relevant to that electronic device. To do this, the service computer 104 may identify a template associated with the electronic marketplace within a database of template data 716. The generated product listing may include an image of the device 102, a description related to the device 102, one or more of the parameter values 708, and/or any suitable device-related information. The product listing may include a price based on the determined device valuation. The product listing for the device 102 may be generated without user interaction.

In some embodiments, upon creation of the product listing, the service computer 104 may provide the product listing to the electronic marketplace 712 to be added to the set of product listings 714. In some embodiments, upon creation of the product listing, the service computer 104 may provide the product listing to the user device 704 for approval prior to adding the product listing to the set of product listings 714.

By way of illustrative example, consider a scenario in which a user wishes to sell his digital camera (device 102). In this scenario, the user may indicate to the service computer that the camera is to be sold on a particular electronic marketplace. The service computer may establish a communication session with the camera and provide instructions for executing a performance evaluation. Upon receiving these instructions, the camera may initiate one or more of its functions and collect data on the performance of those functions. The collected data related to the performance of the camera's functions may then be provided to the service computer as a set of parameter values. Once the service computer has received the set of parameter values from the camera, the service computer may generate a valuation for the camera based on the parameter values and model information related to the camera. The service computer may then generate a product listing for the camera that is formatted based on specifications of the particular electronic marketplace that the user wishes to sell the camera on. Once the product listing has been generated, it may be added as a listing to the electronic marketplace. In this way, the user need only initiate the process and his camera will be offered for sale without any further interaction on his part.

Although FIG. 7 depicts an example in which a performance evaluation has been performed and a device valuation has been generated, it should be noted that some embodiments of the disclosure may not include a performance evaluation and/or the generation of a device valuation. For example, in some embodiments, the electronic device may be caused to provide at least some portion of model information to the service computer, with which it may query the model information database for additional model information. In this example, the service computer may generate a product listing for the electronic device based on the model information. In some embodiments, the product listing may be silent as to the offer price or valuation (e.g., the product listing may be listed on an auction electronic marketplace). In some embodiments, the service computer may generate a product listing with an offer price that represents an average price at which similar items are being sold.

Figure 8:
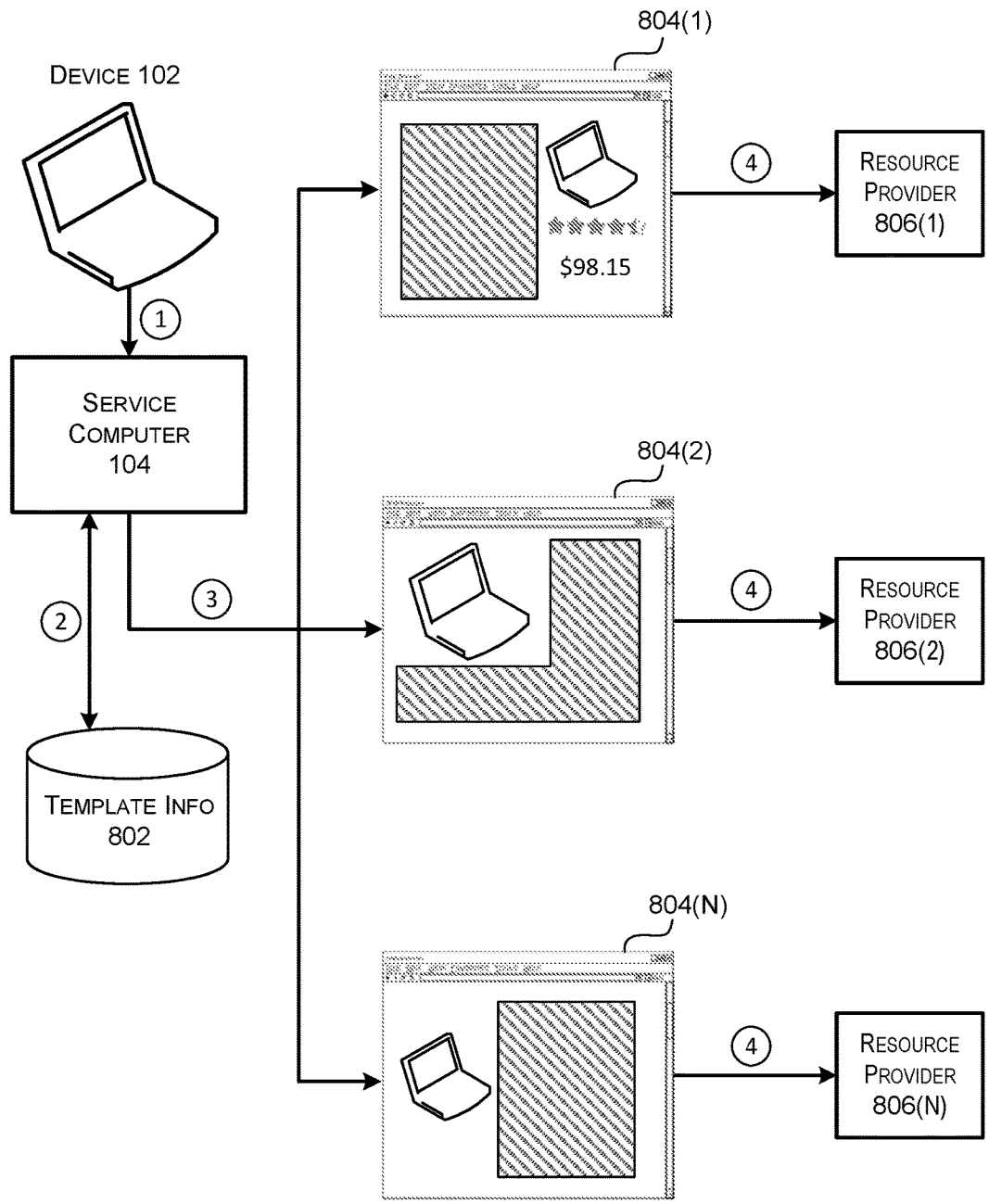
FIG. 8 depicts an illustrative example of techniques in which a device may automatically generate offer listings on one or more resource provider websites in accordance with at least some embodiments.

FIG. 8 depicts an illustrative example of techniques in which a device may automatically generate offer listings on one or more resource provider websites in accordance with at least some embodiments. In FIG. 8, a service computer 104 is depicted as being in communication with a device 102. Service computer 104 and device 102 may be examples of service computer 104 and device 102 depicted in FIG. 1. Additionally, the service computer 104 may have access to template information 802, which may include a number of templates associated with various resource providers.

In accordance with at least some embodiments, the device 102 may initiate a process to list itself for sale on one or more resource providers. In some embodiments of this process, the device 102 may provide a number of details to the service computer 104 at step 1 along with a request to initiate the process. For example, the device 102 may provide to the service computer 104 model information, a current ownership status, an age of the device 102, an image of the device 102 (which may be a stock image or an actual image of the device 102), an estimated value of the device 102, or any other suitable information. In some embodiments, a value of the device 102 may be estimated based on performance metrics as described in greater detail with respect to FIG. 3 above. In some embodiments, the value of the device 102 may be estimated based on past sale price information as described in greater detail with respect to FIG. 9 below. In some embodiments, the service computer 104 may estimate a value of the device based on the provided information by comparing the provided information to that of similar devices.

Once the service computer 104 has received the request and information from the device 102, the service computer 104 may identify a number of resource providers upon which to list an offer for the device 102. In some embodiments, a list of resource providers may be provided by the device 102 itself. In some embodiments, the service computer 104 may identify a user account associated with the device 102 and may determine a list of resource providers based on one or more user preferences indicated in the account. For example, the service computer 104 may determine that the current ownership status of the device 102 indicates that it is associated with a particular account. The service computer 104 may then determine that the owner of the particular account prefers that his or her devices be listed on Amazon.com and eBay.com.

In some embodiments, the service computer 104 may determine a list of resource providers based on user feedback. For example, the service computer, upon receiving a request from device 102 to initiate the described process, may determine that the device is associated with a particular account. In this example, the service computer 104 may identify contact information (e.g., a phone number, email address, etc.) associated with an owner of the device 102 stored in relation to the account. The service computer may generate a notification and transmit the generated notification to that contact information. In some embodiments, the service computer 104 may request a list of resource providers from the user. For example, the service computer 104 may provide an initial list of available resource providers to the user's contact information and may ask the user to select one or more resource providers from that list. The service computer 104 may then receive the user's selection of resource providers from the user as a response.

Once the service computer 104 has identified a list of resource providers on which to list offers for the device 102, the service computer 104 may identify templates for each of the resource providers of the list of resource providers from template information 802 at step 2. In some embodiments, each template may include a number of data fields which are formatted according to a layout or structure used by a particular resource provider. In these embodiments, a template for a particular resource provider may be populated with information related to the device 102 and/or a user associated with the device 102 (e.g., an owner) in order to generate offer listings 804 at step 3. For example, the template for a particular resource provider may be populated with information provided by the device 102 at step 1, information stored in an account associated with the device 102 maintained by the service computer 104, as well as information stored in relation to a category to which the device 102 belongs. In this way, the service computer 104 may automatically generate a number N of offer listings 804 (1–N) which are each compatible with a number of different resource providers.

Once the service computer 104 has generated a number of offer listings 804, the service computer 104 may submit those generated offer listings to their respective resource providers 806 (1–N) at step 4. In some embodiments, an account maintained by the service computer 104 may also maintain login information for one or more accounts at various resource providers. For example, the service computer 104 may maintain, for a particular user, a login identifier and password for an account maintained by a resource provider for that user. In these embodiments, the service computer 104 may, upon generating offer listings 804 as described above, use the user's login and password to post the offer listings to the resource provider website. In some embodiments, the service computer 104 may use an account that it maintains with respect to each of the resource providers to post the offer listing 804 to that resource provider. For example, the service computer 104 may maintain a general account with each resource provider that it uses to post offer listings for each device 102 and/or user.

In some embodiments, once the service computer 104 has posted the offer listings 804 to their respective resource providers, the service computer 104 may monitor a status of each of the offer listings on each of the resource providers. In some embodiments, this may involve receiving notifications (e.g., email notifications) indicating a change in status (e.g., a purchase of the device). In some embodiments, this may involve periodically querying a status of the offer listing from the resource provider.

In some embodiments, the service computer 104 may be configured to deactivate one or more offer listings upon receiving an indication of a change in status of an offer listing. For example, upon detecting that the device 102 has been sold on a particular resource provider, the service computer 104 may be configured to cancel or withdraw each of the offer listings 804 submitted to the remaining resource providers. In this way, double purchasing of the device 102 may be prevented.

In some embodiments, the service computer 104 may be further configured to perform one or more post-sale processes. For example, in some embodiments, the service computer 104 may be configured to purchase shipping and/or generate a shipping label. This may involve providing at least a portion of the information provided by the device 102 (e.g., weight and/or size information) to a third party shipping entity (e.g., United States Postal Service). In some embodiments, the service computer 104 may be configured to collect payment from a purchaser of the device 102 and deposit that payment (or a portion thereof) into an account belonging to the owner of the device 102. In some embodiments, the service computer 104 may keep a portion of the payment (e.g., as payment for the services described).

In some embodiments one or more offer listing 804 may include an indication that the price represents an automatically-estimated value. This may serve to ensure a potential purchaser that the device 102 is not overpriced and/or that the price is an accurate reflection of the device's value. In some embodiments, an offer listing for a particular resource provider may include an auction-style listing. In these embodiments, an estimated value may be used as a starting price or reserved price for the device 102.

Figure 9:
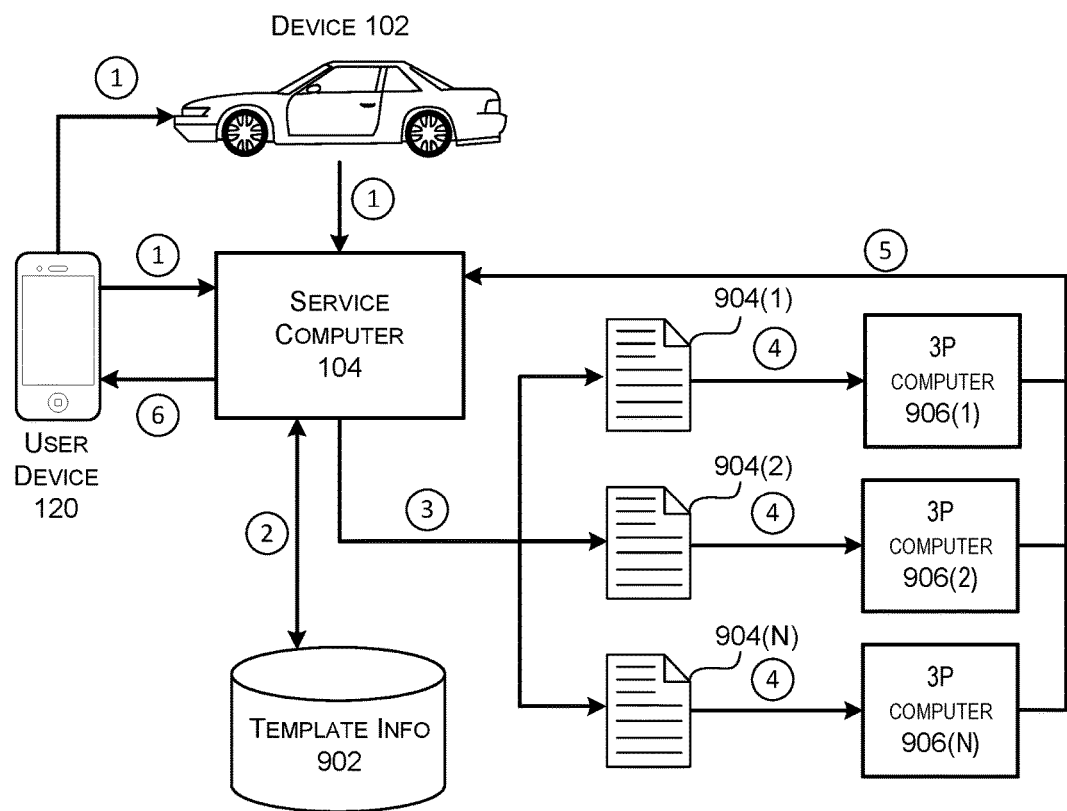
FIG. 9 depicts an illustrative example of techniques in which a device may automatically obtain device related services from one or more third-party computers in accordance with at least some embodiments.

FIG. 9 depicts an illustrative example of techniques in which a device may automatically obtain device related services from one or more third-party computers in accordance with at least some embodiments. In this example, a device 102 may receive an indication that it should be insured. In FIG. 8, a service computer 104 is depicted as being in communication with a device 102 as well as user device 120. Service computer 104, device 102, and user device 120 may be examples of respective service computer 104, device 102, and user device 120 depicted in FIG. 1. Additionally, the service computer 104 may have access to template information 902, which may include a number of templates associated with various resource third party services.

At step 1, the service computer may receive an indication that a device-related service should be obtained with respect to the device 102. For the purposes of the process depicted in FIG. 9, consider a scenario in which an owner of the device 102 wishes to insure the device 102 (i.e., the device-related service is insurance). The indication at step 1 may be received in a number of ways. For example, in some embodiments, the indication may be received by the device 102. In this example, the process may be initiated via the device 102 itself (e.g., via a button located on the device 102) or by a communication between the device 102 and a user device 120. In a second example, the indication may be received by the service computer 104 from the user device 120.

The device 102 may communicate various details (e.g., an estimated value of the device 102) to the service computer 104 in a manner similar to that described in FIG. 8 above at step 1. The service computer 104 may then identify a number of potential third party computers 906 (for the purposes of this example, insurers) for the device 102. In some embodiments, the number of potential insurers may be identified based on a type or category associated with the device 102. For example, if the device 102 is an automobile, then the service computer 104 may identify a number of automotive insurance providers.

Once the service computer 104 has identified a number of potential insurers, the service provider may obtain templates 904 associated with each of the identified potential insurers from the template information 902 at step 2 and populate those templates 904 at step 3. For example, each potential insurer may maintain some format or structure in which insurance requests must be submitted for that insurer. In this example, the service computer may identify templates 904 (1-N) associated with each of those insurers and populate those templates with details relevant to obtaining insurance from the respective insurer.

Upon population of each of the templates, the service computer 104 may submit each request (e.g., the populated template) to a respective third party computer 906 associated with an insurer for that request at step 4. Each of the third-party computers associated with the respective insurers may then independently generate a quote for the requested insurance based on the submitted request. The service computer 104 may subsequently receive a number of insurance quotes from the potential insurers in response to the submitted requests at step 5.

In some embodiments, the service computer 104 may be configured to automatically (e.g., without user interaction) select an appropriate insurer for the device 102 based on the received quotes. For example, the service computer 104 may be configured to automatically select the insurer that provides a most-favorable quote (e.g., the lowest insurance quote). In some embodiments, a user may prioritize aspects of an insurance quote (e.g., via user preferences stored on the service computer 104) that the service computer 104 may use to select an appropriate insurer. In some embodiments, the service computer 104 may be configured to provide the received insurance quotes to a user device associated with the device 102 at step 6 in order to enable a user (e.g., an owner of the device 102) to select a quote from the list of quotes. In this example, upon receiving a selection of a quote from the user, the service provider may initiate a process to obtain insurance for the device 102 via an insurer associated with the selected insurance quote.

Although the device-related service described with respect to FIG. 9 is insurance coverage, it should be noted that this is for illustrative purposes only and the device-related service may include any suitable service related to a particular device. For example, a device-related service might be a maintenance or repair service. In this example, the process described in FIG. 9 may be initiated upon determining that a performance of the device (e.g., as indicated via a performance evaluation executed by the device) is below some threshold acceptable performance level.

Figure 10:
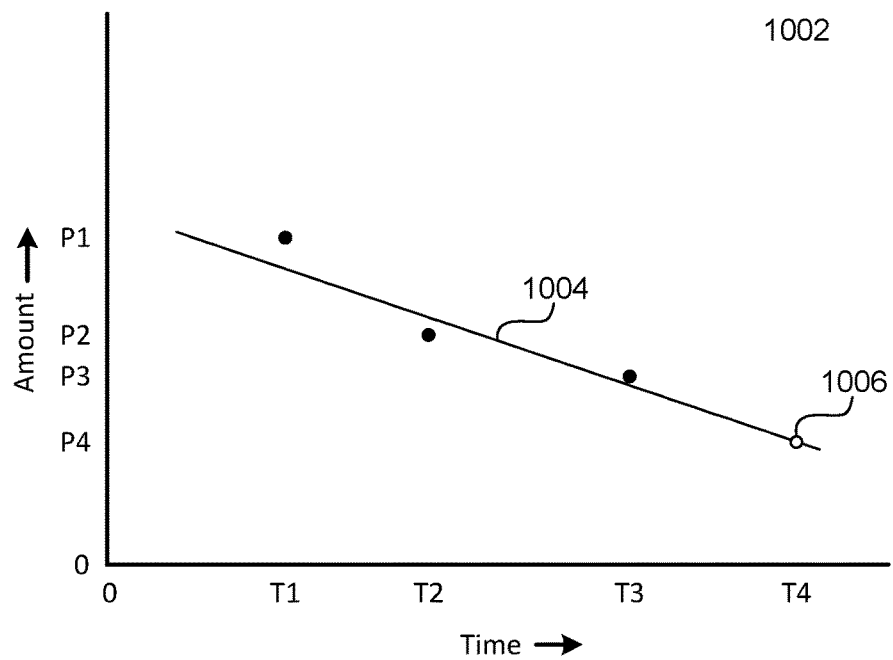
FIG. 10 depicts an illustrative example of techniques for estimating a value for a device based on historical information for that device in accordance with at least some embodiments.
Figure 10:
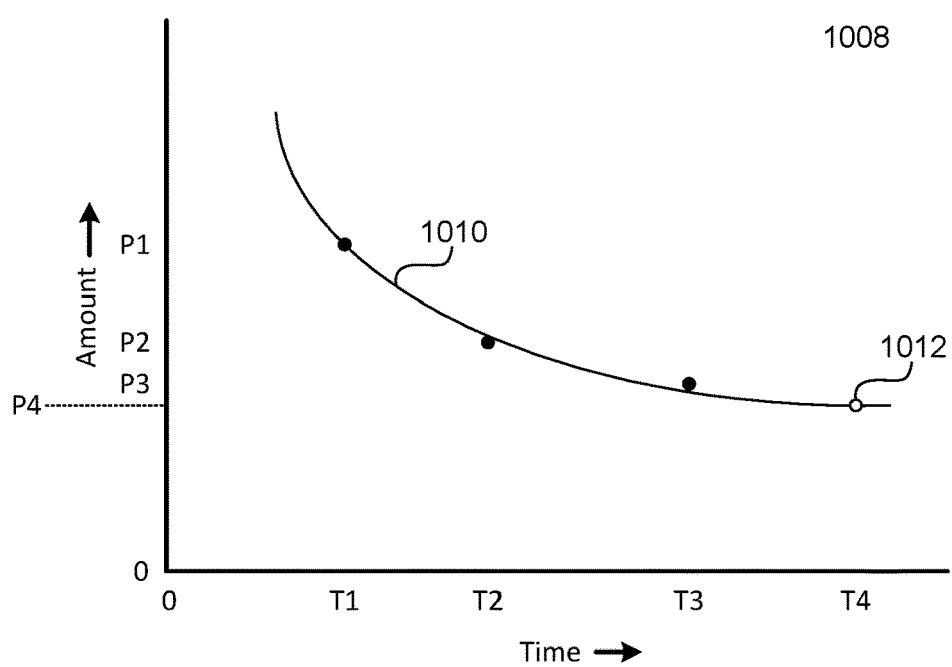

FIG. 10 depicts an illustrative example of techniques for estimating a value for a device based on historical information for that device in accordance with at least some embodiments. In FIG. 10, two illustrative graphs 1002 and 1008 are depicted as illustrating different techniques for estimating a value for a device.

In some embodiments, a device (e.g., a device 102 as depicted in FIG. 1) may store historical information associated with the device. For example, each time that an ownership status of the device changes, ownership information stored in the device may be updated to reflect the changes in ownership status. In some embodiments, the device may store an indication of historical prices that the device was purchased for as well as respective dates associated with those purchase prices.

In each of the graphs 1002 and 1008, the device may be associated with historical purchase amounts and times. For example, in each of the illustrated graphs, the device may have been purchased at some amount P1 at time T1, amount P2 at time T2, and amount P3 at time T3. For the purposes of these illustrative examples, assume that a value P4 of the device is being estimated at time T4. As depicted in graphs 1002 and 1008, in some embodiments, the device may estimate its own current value by fitting some function or curve to the historical data. In some embodiments, outliers in the historical data may be disregarded or discarded.

As depicted in graph 1002, the device may use a linear function to estimate its value at time T4. This may involve generating a straight line 1004 that most closely fits the historical data. In this example, the straight line 1004 may be represented by the linear function, such that a value P4 may be estimated by solving the linear function for time T4 to determine a value at some point 1006 on the straight line 1004. It should be noted that while a linear function may not be as accurate as some other functions, an estimated value may be calculated much quicker that if those other functions are used.

As depicted in graph 1008, the device may use a non-linear function to estimate its value at time T4. This may involve generating a curved line 1010 that most closely fits the historical data. In this example, the curved line 1010 may be represented by the non-linear function, such that a value P4 may be estimated by solving the non-linear function for time T4 to determine a value at some point 1012 on the curved line 1004. It should be noted that the use of a non-linear function may provide for a more accurate estimated value than if a linear function is used to estimate the value. It should also be noted that the examples provided are not intended to be limiting and one skilled in the art would recognize that a number of different techniques may be available for estimating a value of a device using historical data.

In some embodiments, the type of function used to estimate a value for the device at time T4 may be determined based on a depreciation standard for that device. For example, Generally Accepted Accounting Principles (GAAP) may indicate a particular way in which some item types should be depreciated for accounting purposes. In these embodiments, the function used to estimate a value for a particular device may be determined based on a depreciation function indicated as being appropriate for a particular category that the device belongs to.

Figure 11:
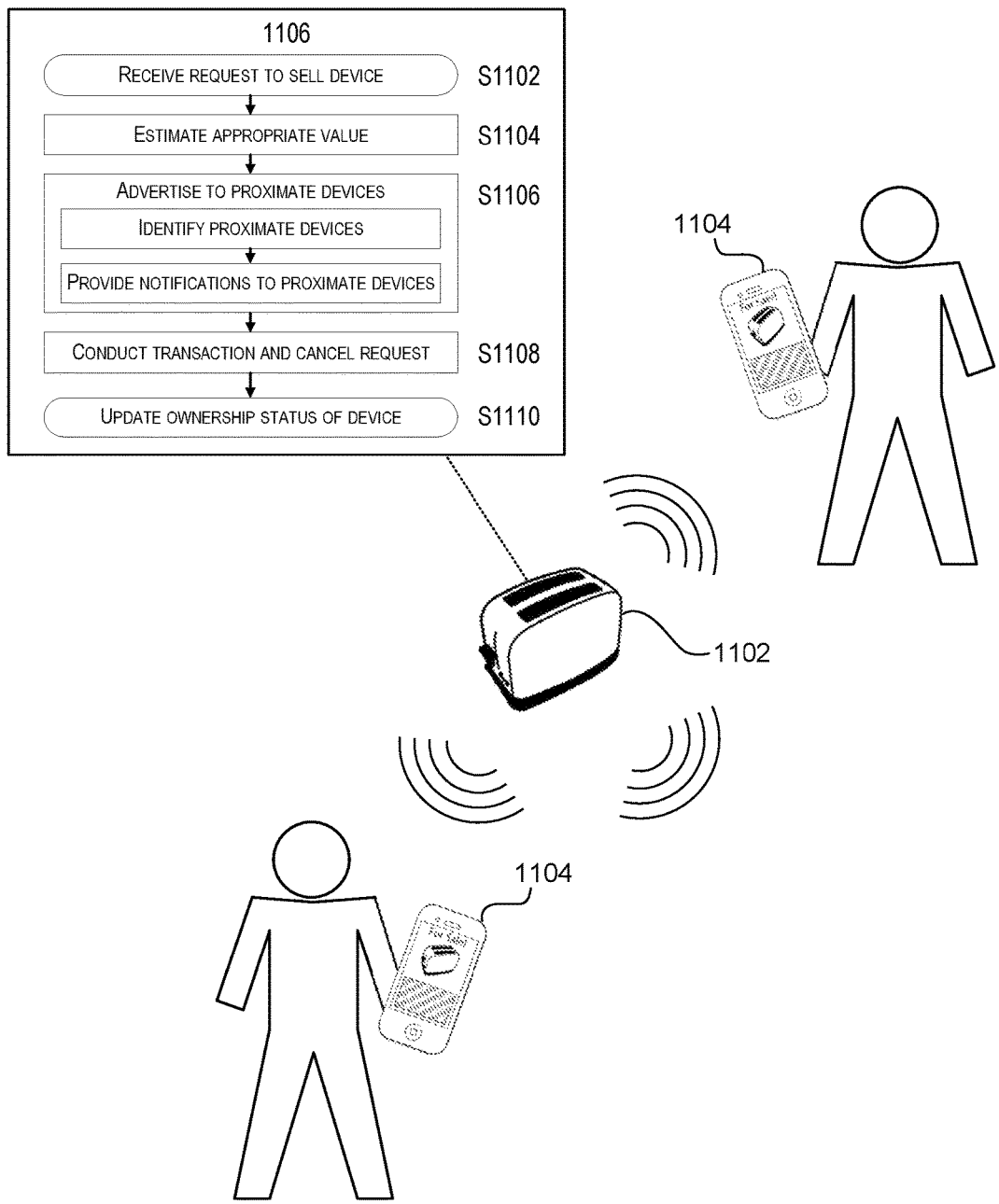
FIG. 11 depicts an illustrative example of a technique by which an item may offer itself for sale in accordance with at least some embodiments.

FIG. 11 depicts an illustrative example of a technique by which an item may offer itself for sale in accordance with at least some embodiments. In FIG. 8, techniques were described for generating offer listings for a device and posting those offer listings to a resource provider website. However, it should be noted that the device may offer itself for sale in some embodiments without communicating with resource providers, as depicted in FIG. 11.

In FIG. 11, a device 1102 (which may be an example of device 102 depicted in FIG. 1) may be configured to advertise its availability for sale to a number of proximate devices 1104. In some embodiments, this may be accomplished via a short range communication channel (e.g., Bluetooth, WLAN, or any other suitable wireless communication means). In some embodiments, the technique may involve the performance of a process 1106. Process 1106, as described herein, may be performed by a device 1102, using one or more processing units.

In process 1106, the device 1102 may receive a request indicating that the device 1102 should offer itself for sale at S1102. In some embodiments, a user may select or otherwise activate a button or other suitable mechanism on the device 1102 itself, which may initiate process 1106. In some embodiments, the request may be received via a communication session established between the device 1102 and a user device such as a mobile phone or laptop. In some embodiments, a user may submit a request to a service computer, which may be in communication with the device 1102 via a network connection. In these embodiments, the service computer may initiate the process 1106 by transmitting a request to the device 1102. In some embodiments, the service computer may provide information relevant to the request (e.g., terms of the sale, etc.) to the device 1102. In embodiments in which the process 1106 is initiated by an entity other than the service computer, the device 1102 may communicate with a service computer to define various terms of the sale of the device 1102. For example, the service computer may identify one or more user preferences related to a potential sale of the device.

At S1104, the process 1106 may involve estimating an appropriate value for the device 1102. A number of techniques for estimating a value of a device are described herein, which may be used in S1104. For example, the device may execute a performance evaluation and generate an estimated value in accordance with the process 300 described with respect to FIG. 3 above. In another example, the device 1102 may use historical information for the device to estimate a current value in accordance with the techniques described in FIG. 10 above. It should be noted that there are a number of suitable techniques for estimating a value of the device that may be used here.

At S1106, the process 1106 may involve advertising itself to proximate devices. In some embodiments, this may involve identifying proximate devices and providing notifications to those proximate devices. For example, the device 1102 may perform one or more device discovery techniques to identify proximate devices. Device discovery techniques typically involve a short-range communication mechanism carrying out a search within its range to find other devices in communication range of the discovering device that have registered themselves as visible to other devices. For example, the device 1102 may carry out a device discovery process using a Bluetooth communication mechanism which will identify any visible Bluetooth-connected devices within range of the device 1102 (typically 10 meters for a mobile device).

Once a number of proximate devices have been identified by the device 1102, S1106 may involve generating and transmitting notifications to the identified proximate devices. In some embodiments, the notifications may be generated so that they are particular to a specific identified device. For example, an identified device may require notifications be provided in a particular format or structure.

A notification generated and provided to a proximate device in this manner may include any number of details. In some embodiments, the notification may include details related to the device 1102 itself. For example, the notification may include a model number, an age, a description, usage metrics, performance metrics, or any other suitable information. In some embodiments, the notification may include an estimated value of the device 1102. In some embodiments, the notification may include a current ownership status. In some embodiments, the notification may include a current location of the device (enabling a user to view and/or collect the device 1102). The notification may also include a means of responding to the notification and/or conducting a transaction to obtain ownership of the device 1102. In some embodiments, the device 1102 may be configured to receive a request to conduct a transaction from a proximate device via this means.

At S1108, the process 1106 may involve, upon receiving a request to conduct a transaction for the device 1102. In some embodiments, a user may provide his or her payment information (e.g., a credit card number or token) to the device 1102 via the proximate device. In some embodiments, the device 1102 may convey the payment information, along with any other relevant details (such as an amount of the transaction) to the service computer (e.g., service computer 104 of FIG. 1). In these embodiments, the service computer may generate an authorization request message to be provided to an authorization entity associated with the provided payment details. The service computer may subsequently route the generated authorization request message to the authorization entity via the transaction processing network. Once the service computer receives an authorization response message corresponding to the authorization request message, the service computer may convey to the device 1102 whether or not the transaction has been approved. The device 1102 may then communicate a status of the transaction to the proximate device. Upon determining that the transaction has been approved, the device 1102 may cancel the request to offer itself for sale and may cease advertising itself to proximate devices.

At S1110, the process 1106 may involve updating the ownership status of the device 1102 upon determining that the transaction conducted at S1108 has been approved. In some embodiments, the device 1102 may overwrite one or more fields in memory of the device 1102 with information provided by the proximate device. In some embodiments, the date and sale price of the transaction may be stored within a database of historical information stored in memory of the device 1102 or in memory of the service computer. In this way, the device 1102 may complete a transfer of its own ownership to another party in a relatively automated fashion (i.e., the user need only initiate the process).

Figure 12:
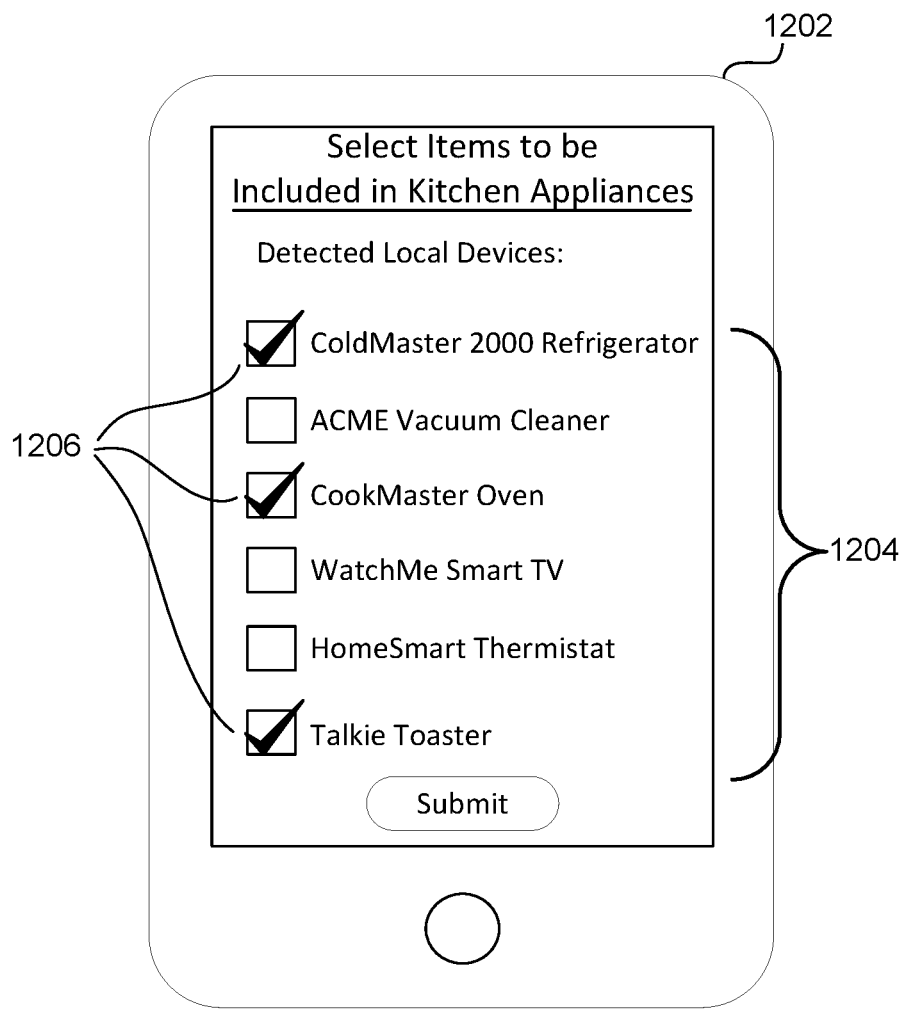
FIG. 12 depicts an illustrative example of a technique for identifying a grouping of devices in accordance with at least some embodiments.

FIG. 12 depicts an illustrative example of a technique for identifying a grouping of devices in accordance with at least some embodiments. In some embodiments, a user may be provided with a category or other grouping into which one or more items should be placed. In some embodiments, a grouping may include a number of devices within some geographic region. For example, a grouping may include all of the devices within a house or, alternatively, all of the devices within a particular room of a house. In some embodiments, a value to be associated with a particular geographic region may be estimated based on a grouping associated with that geographic region (e.g., by summing the estimated values of the devices in the grouping).

In some embodiments, the technique depicted in FIG. 12 may be performed on a user device 1202, which may be an example of user device 120 depicted in FIG. 1. In some embodiments, the user device 1202 may be in communication with a number of devices 1204, which may each be separate examples of device 102 depicted in FIG. 1. In some embodiments, the user device 1202 may use some appropriate means of short-range communication (e.g., Bluetooth) to communicate with the devices 1204. In some embodiments, the user device 1202 may establish a connection with a network (e.g., a local area network (LAN)), and may connect to a number of devices 1204 also connected to that network.

In some embodiments, a user may be requested to provide an indication of each of the devices 1206 that belong to a particular grouping. In some cases, the user may also provide the grouping. For example, the user may indicate that at least some devices 1204 belong to a group "Kitchen Appliances." In this example, the user may be presented with a complete list of the devices 1204 that the user device 1202 is able to detect and may be asked to select a number of devices 1206 that belong in the grouping "Kitchen Appliances." Once the user has completed the selection of the devices 1206, the user may select an option to submit the selections. In some embodiments, the options may be submitted to a service computer. A service computer, upon receiving an indication of one or more devices 1206 that belong to a particular grouping, may estimate a value of the grouping. In some embodiments, this may involve initiating a value estimation process for each of the devices included in the grouping.

Figure 13:
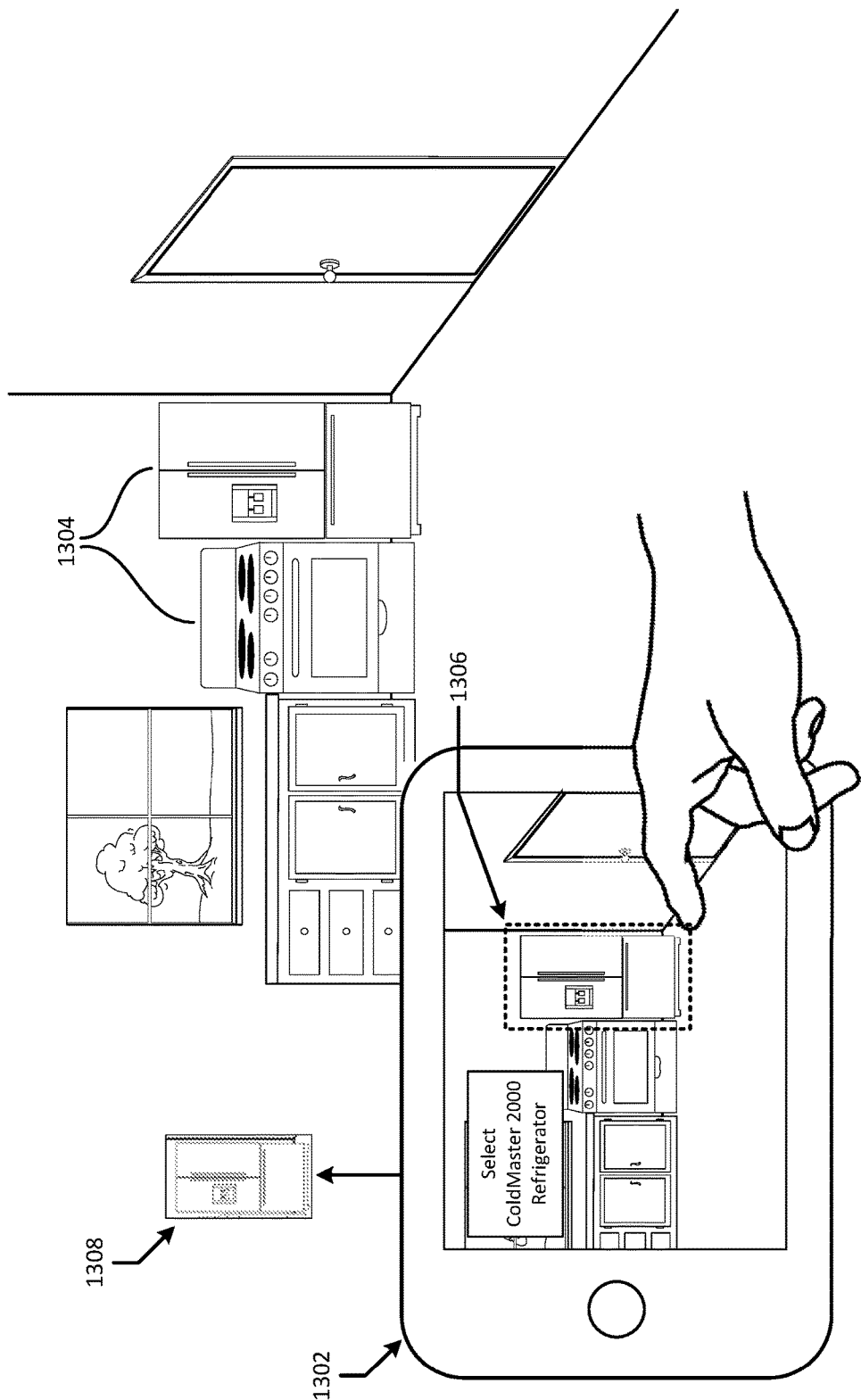
FIG. 13 depicts an illustrative example of a technique for providing device-specific images in accordance with at least some embodiments.

FIG. 13 depicts an illustrative example of a technique for providing device-specific images in accordance with at least some embodiments. In FIG. 13, a user device 1302 may be in communication with a number of devices 1304 (e.g., directly via a wireless connection or indirectly via a service computer). There are a number of instances described throughout the disclosure in which an image of a device 1304 may be used. In some embodiments, as disclosed, the image used may be a stock image of a device 1304. However, in some embodiments, it may be beneficial to use an actual (and current) image of the device 1304. An example technique for obtaining such an image is described herein.

In some embodiments, a user may, upon initiation of one or more of the processes described herein, be prompted to provide a current photo of a device 1304. In some embodiments, a camera of the user device 1302 may be activated upon receiving the prompt to provide a current photo. In some embodiments, the user may capture an image of the device 1304 via the camera view. In some embodiments, the user may select some area 1306 in the camera view that includes an image of the device 1304. Upon capturing an image 1308 of the item 1304, the image 1308 may be provided to one or more entities. In some embodiments, the image 1308 may be provided to a service computer, which may subsequently use the image 1308 in one or more processes described herein. In some embodiments, the image 1308 may be provided to the device 1304, which may store the image 1308 in memory for future use.

Figure 14:
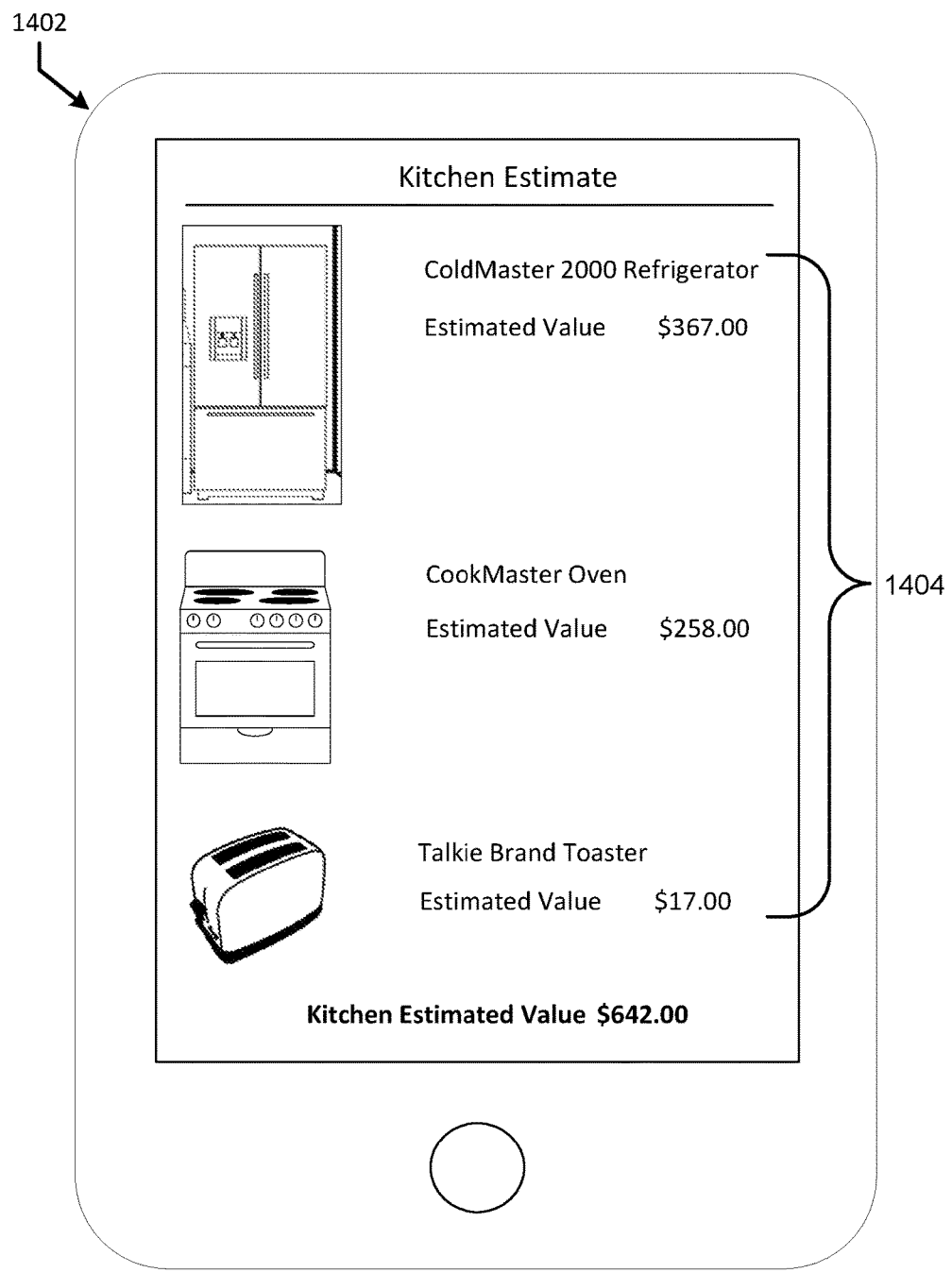
FIG. 14 depicts an illustrative example of a technique for providing an estimated value of a region or grouping of devices in accordance with at least some embodiments.

FIG. 14 depicts an illustrative example of a technique for providing an estimated value of a region or grouping of devices in accordance with at least some embodiments. In FIG. 14, a user device 1402 may be in communication with a service computer and may receive at least a portion of the depicted information from the service computer.

In some embodiments, a service computer may maintain estimated values for a number of different devices 1404. The devices 1404 may each belong to one or more groupings. An example of a technique that may be used to assign a device to a grouping is described in greater detail above with respect to FIG. 12. In some embodiments, an estimated value for a grouping may consist of a sum of the estimated value for each of the devices in that grouping. Estimated values for the devices 1404 may be periodically updated. For example, each device in the grouping may automatically provide a new estimated value to the service computer on a weekly basis. In a second example, the service computer may cause each device in a grouping to perform a device valuation process on a weekly basis. In some embodiments, a device may be removed from a grouping upon determining that the device can no longer be detected (e.g., it is no longer connected to a local network).

In some embodiments, a user may submit a request for an estimate of a region or grouping. In this example, the service computer may generate an estimated value based on the most current estimated values for each of the devices 1404 in the grouping. For example, upon determining that one or more devices 1404 can no longer be detected, a value for a grouping may be estimated using an older estimated value for the undetectable devices.

By way of illustration, consider the following use case. In one example, upon determining that a fire has devastated a user's kitchen, the user may be required to submit a claim for reimbursement to his or her insurance agent. This often requires that the user provide a list of items that were destroyed as well as an estimated value for each of those items. Using embodiments of the system described herein, a user could simply request an estimate of the kitchen, and would be provided with a full list of the devices 1404 as well as the most current values for those items. As can be envisioned, this system significantly increases the efficiency of submitting such claims.

Figure 15:
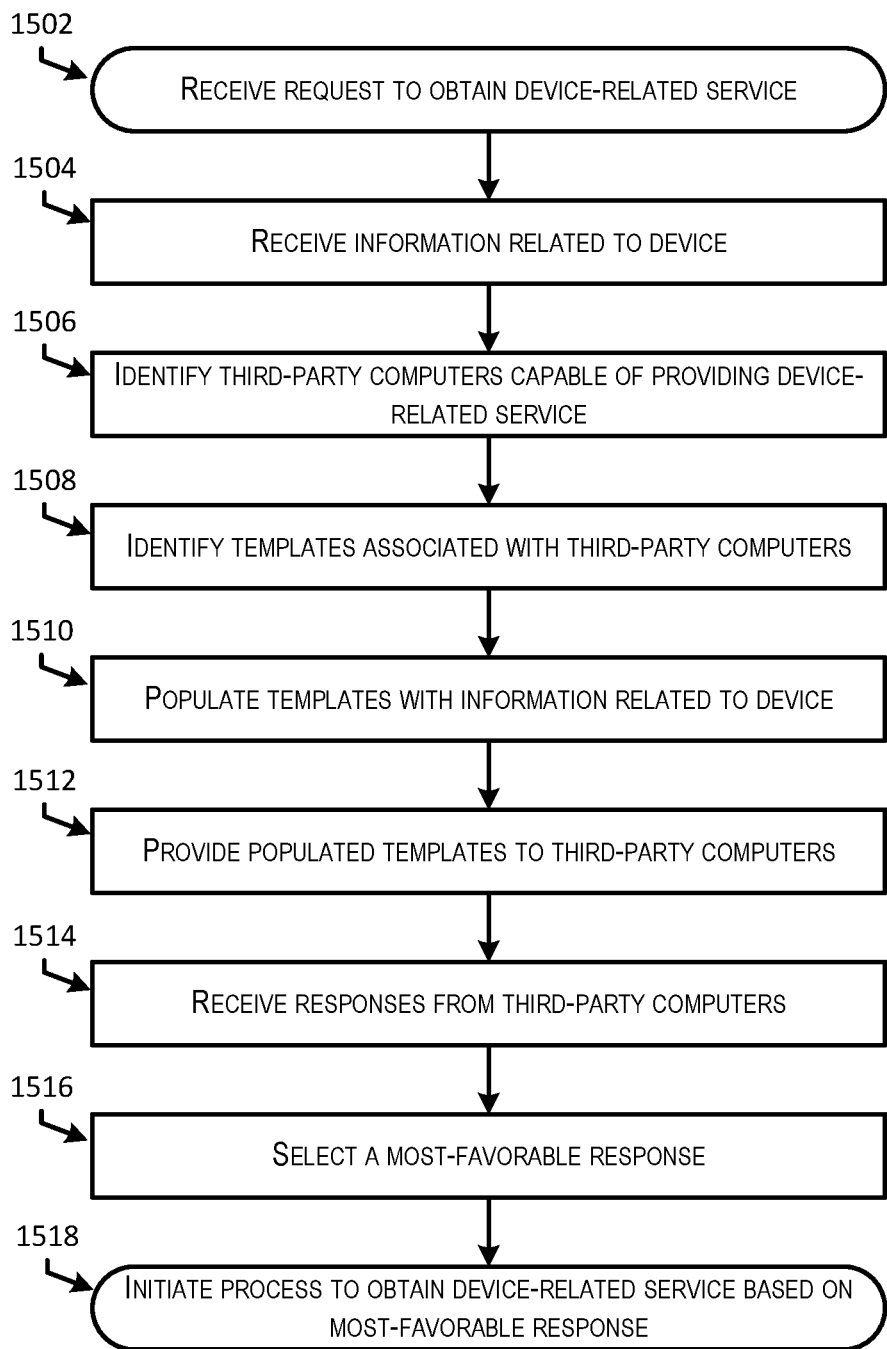
FIG. 15 depicts an illustrative flow diagram showing an example process for obtaining a device-related service with respect to a device in accordance with at least some embodiments.

FIG. 15 depicts an illustrative flow diagram showing an example process for obtaining a device-related service with respect to a device in accordance with at least some embodiments. Some or all of the process 1500 depicted in FIG. 15 may be performed by a service computer (e.g., the service computer 104 depicted in FIG. 1.

In some embodiments, process 1500 may begin at 1502, when the service computer receives a request to obtain a device-related service with respect to a particular device. In some embodiments, the request may be received from the device itself. For example, the request may be initiated by the device upon activation of a button or other mechanism on the device itself. In another example, the device may receive an indication of a change in ownership status. In this example, the device may automatically (e.g., without user interaction) initiate the process upon determining that the change in ownership status warrants such a request. By way of illustration, if the device is a vehicle, that vehicle may initiate a process to obtain insurance for a new owner upon receiving an indication that it has a new owner. In some embodiments, the request may be received from a user device associated with the device for which the device-related service is to be obtained. For example, the request may be received from a user's mobile phone. In this example, the service computer may identify the device based on its relationship to the mobile phone. It should be noted that the device-related service may include an service specific to a particular device. For example, a device-related service may include providing insurance coverage for the device, maintaining or repairing the device, removing or installing the device, or any other suitable service specific to the device.

At 1504, the process 1500 may involve receiving information related to the device at the service computer. For example, the service computer may receive information obtained via a performance evaluation executed on the device. In another example, the service computer may receive an estimated value of the device. It should be noted that there are a number of ways in which a value for a device may be estimated that are described herein. For example, a value may be estimated based on the device's performance as indicated in a performance evaluation executed on the device. In another example, a value may be estimated based on historical data (e.g., past sale prices) for the device. These techniques are each described in greater detail elsewhere in the disclosure. Information provided by the device to the service computer may include model information, a current ownership status of the device, an age of the device, an image of the device (which may be a stock image or an actual image of the device), an estimated value of the device, or any other suitable information.

At 1506, the process 1500 may involve identifying a number of third-party computers capable of providing the device-related service. In some embodiments, the service computer may store an indication of third-parties and services offered by those third parties. In some embodiments, the services offered by a particular third party may be specific to a particular category or subcategory of device. For example, an auto-repair service provider (i.e., a third party) may provide repair services for devices categorized as an automobile. In this example, a German auto-repair service provider may provide repair services for devices categorized as automobiles which are also of German origin.

At 1508, the process 1500 may involve generating and sending requests for the device-related service to the number of third-party computers. In some embodiments, this may involve identifying a number of templates associated with the number of third-party computers. For example, the service computer may maintain a template for each third-party computer that includes a structure or format for submitting requests to that particular third-party computer. Upon identifying a number of third-party computers, the service provider may subsequently retrieve each of the templates stored in association with those third-party computers.

At 1510, the process 1500 may involve populating the identified templates with information related to the device. In some embodiments, the templates may be at least partially populated with the information received from the device itself (e.g., at 1504). The template may also be populated at least partially with information related to an owner of the device. For example, in addition to receiving information related to the device, the service computer may maintain information associated with an owner of the device (e.g., in an account associated with the device). In this example, the template may be populated with both information received from the device and information maintained by the service computer. Once each of the templates have been populated, the process 1500 may involve providing each of the populated templates to its respective third-party computer at 1512.

At 1514, the process 1500 may involve receiving a number of responses from the third-party computers. In some embodiments, each of the responses may include an estimated cost of providing the device-related service (e.g., a quote) from the respective third-party computer from which it was received. In some embodiments, the responses may also include additional terms related to providing the device-related service. For example, if the device-related service is related to obtaining insurance coverage, then the response may also include information pertaining to deductibles and/or time frames over which the coverage would be relevant.

At 1516, the process 1500 may involve selecting a most-favorable response from the number of responses. In some embodiments, the service computer may be configured to automatically select a most-favorable quote on behalf of the device and/or its owner. For example, in some embodiments, a user may prioritize aspects of a device-related service (e.g., via user preferences stored on the service computer) that the service computer may use to select a most-favorable response for that user. In some embodiments, the service computer may be configured to provide the received responses to a user device associated with the device in order to enable a user (e.g., an owner of the device to select a response from the provided responses. In this example, upon receiving a selection of a response from the user, the service computer may identify the selected response as the most-favorable response.

At 1518, the process 1500 may involve initiating a process to obtain the device-related service from the third-party computer associated with the selected most-favorable response. In some embodiments, this may involve providing payment information stored in association with the device to the third-party computer associated with the selected most-favorable response in a request to provide the device-related service.

Figure 16:
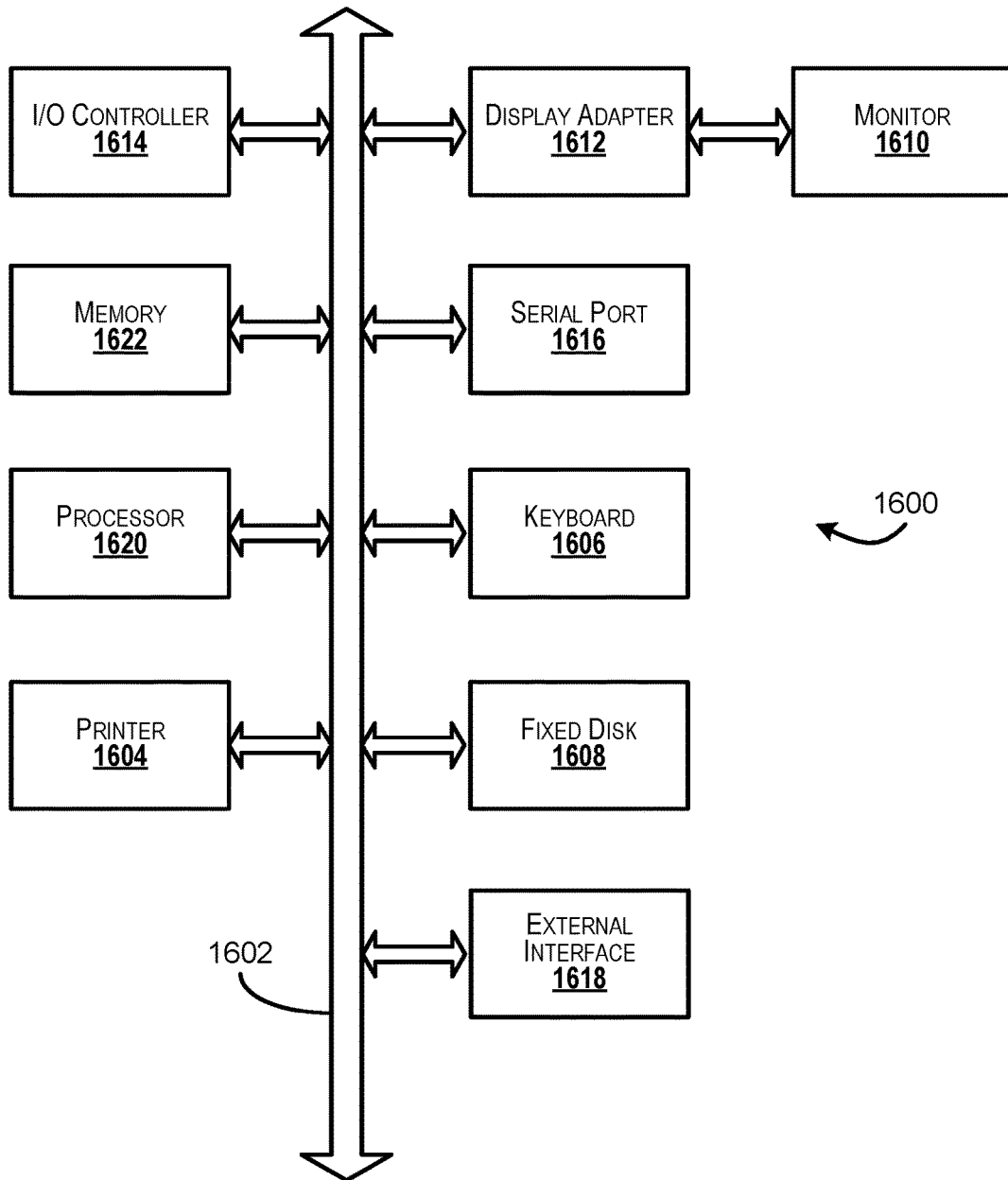
FIG. 16 depicts aspects of elements that may be present in a computer device and/or system configured to implement a method and/or process in accordance with some embodiments of the present invention.

In accordance with at least some embodiments, the system, apparatus, methods, processes and/or operations for valuing a device based on functionality metrics may be wholly or partially implemented in the form of a set of instructions executed by one or more programmed computer processors such as a central processing unit (CPU) or microprocessor. Such processors may be incorporated in an apparatus, server, client or other computing device operated by, or in communication with, other components of the system. As an example, FIG. 16 depicts aspects of elements that may be present in a computer device and/or system 1600 configured to implement a method and/or process in accordance with some embodiments of the present invention. The subsystems shown in FIG. 16 are interconnected via a system bus 1602. Additional subsystems include a printer 1604, a keyboard 1606, a fixed disk 1608, and a monitor 1610, which is coupled to a display adapter 1612. Peripherals and input/output (I/O) devices, which couple to an I/O controller 1614, can be connected to the computer system by any number of means known in the art, such as a serial port 1616. For example, the serial port 1616 or an external interface 1618 can be utilized to connect the computer device 1600 to further devices and/or systems not shown in FIG. 16 including a wide area network such as the Internet, a mouse input device, and/or a scanner. The interconnection via the system bus 1602 allows one or more processors 1620 to communicate with each subsystem and to control the execution of instructions that may be stored in a system memory 1622 and/or the fixed disk 1608, as well as the exchange of information between subsystems. The system memory 1622 and/or the fixed disk 1608 may embody a tangible computer-readable medium.

A computer system can include a plurality of the same components or subsystems, e.g., connected together by external interface or by an internal interface. In some embodiments, computer systems, subsystem, or apparatuses can communicate over a network. In such instances, one computer can be considered a client and another computer a server, where each can be part of a same computer system. A client and a server can each include multiple systems, subsystems, or components.

Embodiments of the invention provide for a number of technical advantages. For example, embodiments of the invention add economic efficiency and functionality to an otherwise inefficient process and market. For example, users are more easily able to assess the value of an electronic device being sold in an electronic marketplace by comparing the electronic device to those similarly situated. Embodiments of the invention also enable a user to cause an electronic device to offer itself for sale on one or more electronic marketplaces without user interaction. This provides an technical advantage in that users are able to acquire a fair market value for the device without undue hardship and with minimum effort on their behalf. Additionally, this allows for a more transparent transaction, by enabling both the seller and buyer of the electronic device to understand the capabilities of the device. For example, it enables a seller to offer "representations and warranties" as to the functionality of a device, as the representations and warranties can reflect the result of the performance test, thus eliminating the need to sell electronic assets "as is" on electronic commerce web sites. Accordingly, purchasers of an electronic device are better able to assess the actual capabilities of the electronic device when a performance evaluation may be performed. This is an improvement over prior art systems, in which a user is only able to ascertain a physical condition of an electronic device to be purchased. In another example, a credit agency may be more willing to extend credit that is secured using an electronic device as collateral if the functionality of the electronic device may be assessed remotely.

Additionally, in at least some embodiments of the disclosure, the system provides the ability to automatically obtain device-related services for a particular device. For example, upon determining that a performance level of a particular device is below some threshold performance level, the system enables the device to automatically request that it be serviced. In a second example, the device is enabled to insure itself. It should be noted that these embodiments significantly reduce the involvement of the device's owner in performing maintenance while increasing efficiency.

It should be understood that any of the embodiments of the present invention can be implemented in the form of control logic using hardware (e.g. an application specific integrated circuit or field programmable gate array) and/or using computer software with a generally programmable processor in a modular or integrated manner. As used herein, a processor includes a single-core processor, multi-core processor on a same integrated chip, or multiple processing units on a single circuit board or networked. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A method of obtaining a device-related service comprising: receiving, at a service computer, a request to obtain the device-related service for a device;
   receiving, at the service computer from the device, information related to the device;
   identifying, by the service computer, a number of third-party computers capable of providing the device-related service;
   providing, by the service computer, requests for the device-related service to the number of third-party computers, each of the requests including the information related to the device by:
      identifying a number of templates, each template of which is associated with a third-party computer of the number of third-party computers;
      populating, by the service computer, the number of templates with the information related to the device; and
      providing, by the service computer, the populated number of templates to the number of third-party computers;
   receiving, at the service computer, a number of responses from the number of third-party computers;
   selecting, by the service computer from the number of responses, a most-favorable response; and
   initiating, by the service computer, a process to obtain the device-related service from a third-party computer associated with the most-favorable response.

2. The method of claim 1, wherein the information related to the device comprises an estimated value of the device.

3. The method of claim 1, wherein the device-related service is insurance coverage for the device.

4. The method of claim 3, wherein the number of third-party computers are computers operated by insurance providers.

5. The method of claim 3, wherein the number of responses comprises a number of quotes for coverage of the device.

6. The method of claim 1, wherein initiating the process to obtain the device-related service from a third-party computer associated with the most-favorable response comprises providing payment information to the third-party computer associated with the most-favorable response.

7. The method of claim 1, wherein the device-related service is a service to sell the device.

8. The method of claim 7, wherein the number of third-party computers comprise at least one electronic retailer server.

9. A service computer comprising:
a processor; and
a memory including instructions that, when executed with the processor, cause the service computer to, at least:
receive a request to obtain the device-related service for a device;
receive, from the device, information related to the device;
identify a number of third-party computers capable of providing the device-related service;
provide requests for the device-related service to the number of third-party computers, each of the requests including the information related to the device by:
identifying a number of templates, each template of which is associated with a third-party computer of the number of third-party computers;
populating the number of templates with the information related to the device; and
providing the populated number of templates to the number of third-party computers;
receive a number of responses from the number of third-party computers;
select, from the number of responses, a most-favorable response; and
initiate a process to obtain the device-related service from a third-party computer associated with the most-favorable response.

10. The service computer of claim 9, wherein the information related to the device includes one or more of a model information, a current ownership status of the device, an age of the device, an image of the device, or an estimated value of the device.

11. The service computer of claim 9, wherein the most-favorable response is determined based on user preferences stored on the service computer.

12. The service computer of claim 11, wherein the most-favorable response is determined without interaction with an owner of the device.

13. The service computer of claim 9, wherein the most-favorable response is determined by providing the number of responses to a user device associated with an owner of the device and receiving a selection of the most-favorable response from the number of responses.

14. The service computer of claim 9, wherein the request to obtain the device-related service for a device is received via a user device associated with an owner of the device.

15. The service computer of claim 9, wherein the request to obtain the device-related service for a device is received from the device.

16. The service computer of claim 9, wherein the number of third-party computers capable of providing the device-related service are determined based at least in part on a category into which the device belongs.

17. A method of changing ownership of a device comprising:
receiving, at the device, a request for the device to sell itself;
estimating, by the device, an appropriate value of the device based on a current performance level for the device;
advertising the device to a number of proximate devices at the estimated appropriate value;
receiving, by the device from a proximate device of the number of proximate devices, a request to conduct a transaction, the request including information to be used in conducting the transaction;
conducting the transaction using the received information; and
updating an ownership status of the device based on the conducted transaction.

18. The method of claim 17, wherein the advertising the device to the number of proximate devices also includes providing a location of the device to the number of proximate devices.

19. The method of claim 17, wherein the number of proximate devices are detected using one or more device discovery techniques performed using a short range communication means.

* * * * *